United States Patent
Watanabe et al.

(10) Patent No.: US 8,494,149 B2
(45) Date of Patent: Jul. 23, 2013

(54) MONITORING DEVICE, EVALUATION DATA SELECTING DEVICE, AGENT EVALUATION DEVICE, AGENT EVALUATION SYSTEM, AND PROGRAM

(75) Inventors: Noriko Watanabe, Tokyo (JP); Shinichiro Kamei, Tokyo (JP); Kaichiro Hatazaki, Tokyo (JP); Shinichi Ando, Tokyo (JP); Takahiro Okonogi, Tokyo (JP); Hiroto Teranishi, Hokkaido (JP)

(73) Assignee: NEC Corporation, Tokyo (JP)

( * ) Notice: Subject to any disclaimer, the term of this patent is extended or adjusted under 35 U.S.C. 154(b) by 1238 days.

(21) Appl. No.: 12/096,698

(22) PCT Filed: Jan. 30, 2007

(86) PCT No.: PCT/JP2007/051521
§ 371 (c)(1),
(2), (4) Date: Jun. 9, 2008

(87) PCT Pub. No.: WO2007/091453
PCT Pub. Date: Aug. 16, 2007

(65) Prior Publication Data
US 2009/0290689 A1    Nov. 26, 2009

(30) Foreign Application Priority Data
Feb. 7, 2006  (JP) ................................ 2006-029691

(51) Int. Cl.
*H04M 3/00* (2006.01)
*H04M 1/64* (2006.01)

(52) U.S. Cl.
USPC .................................. 379/265.07; 379/88.01

(58) Field of Classification Search
USPC ............. 379/265.01, 265.06–265.07, 265.09
See application file for complete search history.

(56) References Cited

U.S. PATENT DOCUMENTS
7,873,156 B1 * 1/2011 Blair ........................ 379/265.06

FOREIGN PATENT DOCUMENTS

| JP | 10154117 A | 6/1998 |
|---|---|---|
| JP | 2001325250 A | 11/2001 |
| JP | 2003208439 A | 7/2003 |
| JP | 2003244327 A | 8/2003 |
| JP | 2004157253 A | 6/2004 |
| JP | 2004229014 A | 8/2004 |
| JP | 2004309965 A | 11/2004 |
| JP | 2005293180 A | 10/2005 |
| JP | 2005318101 A | 11/2005 |
| JP | 3827704 B | 9/2006 |

OTHER PUBLICATIONS

Japanese Office Action for JP2006-029691 issued Jun. 1, 2010.
International Search Report for PCT/JP2007/051521 mailed Feb. 27, 2007.

* cited by examiner

*Primary Examiner* — Rasha Al Aubaidi

(57) ABSTRACT

It is possible to efficiently evaluate utterance while ensuring the effectiveness of the result of the evaluation. A selection unit 4 selects recognition data, which is used in agent evaluation from a data storage unit 7, from recognition data generated by a voice recognition unit 6 on the basis of voice data of utterance by applying a selection operation corresponding to evaluation viewpoint information with reference to an evaluation viewpoint management table 2 through an evaluation viewpoint management unit 3. An evaluation unit 5 displays recognition data and plays the voice data by an evaluation viewpoint management unit 3 by applying an output operation corresponding to evaluation viewpoint information with reference to an evaluation viewpoint management table 2.

30 Claims, 13 Drawing Sheets

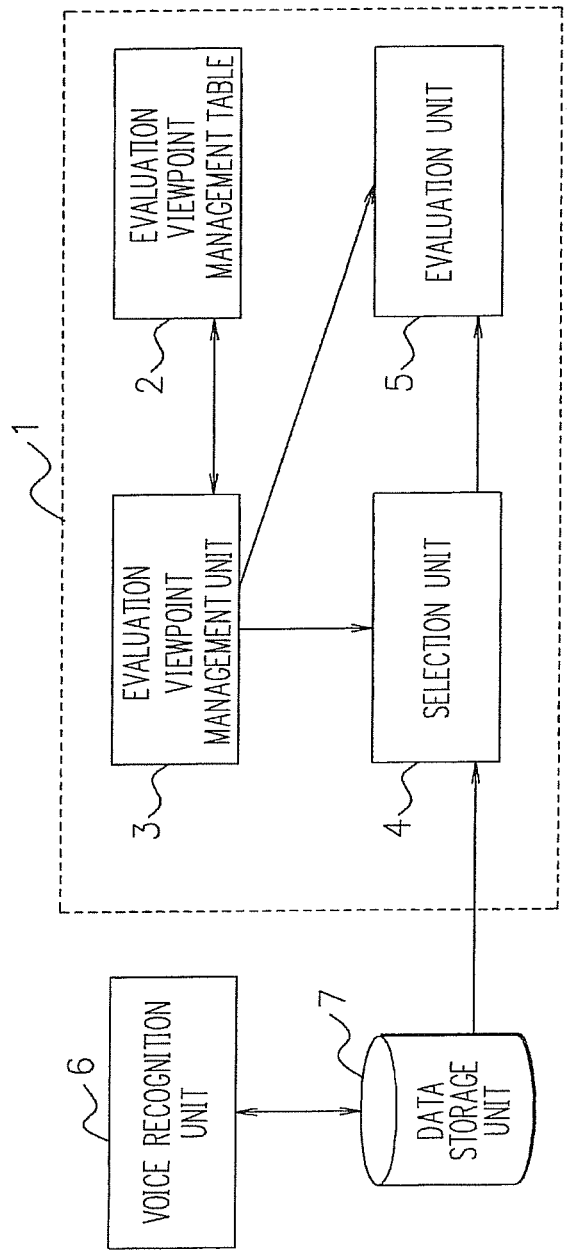

FIG. 2

| EVALUATION POINT | OPERATION OF SELECTION UNIT | OPERATION OF EVALUATION UNIT |
|---|---|---|
| BASIC OF ANSWER (INTRODUCTORY PART) | DETECT THAT "THANK YOU FOR WAITING" DOES NOT APPEAR | MAKE CURSOR BE READY AT THE FRONT PORTION OF TEXT |
| BASIC OF ANSWER (FOR CORPORATION) | DETECT THAT "WE ALWAYS APPRECIATE YOUR BUSINESS" DOES NOT APPEAR | MAKES CURSOR BE READY AFTER NAME OF CORPORATION |
| BASIC OF ANSWER (CLOSING PART) | DETECT THAT "XX IN CHARGE HAVE SPOKEN" DOES NOT APPEAR | MAKES CURSOR BE READY AT A POSITION CORRESPONDING TO THE LAST 30 SECONDS |
| OCCURRENCE OF TROUBLE | DETECT THAT "I'M SORRY" DOES NOT APPEAR, DETECT LONG CONVERSATION | HIGHLIGHT "I'M SORRY", BE READY TO PLAY VOICE |
| | DETECT THAT SAME PHRASE REPEATEDLY APPEARS | HIGHLIGHT CORRESPONDING PHASE, BE READY TO PLAY VOICE |
| | DETERMINE WHETHER THE NUMBER OF LETTERS OF TEXT IS EQUAL TO OR LARGER THAN PREDETERMINED VALUE | MAKE CURSOR BE READY AT THE FRONT PORTION OF TEXT |
| RUDE WORD | DETECT "CLAIMER" | HIGHLIGHT "CLAIMER", BE READY TO PLAY VOICE |
| TRANSMISSION TO OTHER SECTION | DETECT "EXEMPT FROM" | HIGHLIGHT "EXEMPT FROM", BE READY TO PLAY VOICE |
| CUSTOMER SATISFACTION | DETECT "THANK YOU" | HIGHLIGHT "THANK YOU" BE READY TO PLAY VOICE |
| LISTENABILITY | DETECT FREQUENT APPEARANCE OF "UH" | HIGHLIGHT "UH" BE READY TO PLAY VOICE |
| | DETECT INCREASE OR DECREASE OF "UH" | DISPLAY STATISTICAL CHART SHOWING INCREASE AND DECREASE |
| OPERATIONAL PROCEDURE GUIDANCE | DETECT THAT ONLY THE FORMER OF "RE-SETUP" AND "BACKUP" APPEARS | HIGHLIGHT KEYWORD HAVING APPEARED, DISPLAY THE LATTER KEYWORD BY USING PARENTHESES |
| RESPONSE TO EMERGENCY | DETECT THAT "GAS ALARM" AND "SOUNDS" CO-OCCUR | HIGHLIGHT BOTH KEYWORDS |
| AFTER MAKING CUSTOMER WAIT | DETECT "THANK YOU FOR WAITING" | HIGHLIGHT "THANK YOU FOR WAITING", BE READY TO PLAY VOICE |
| RAPID UTTERANCE | DIVIDING THE NUMBER OF LETTERS OF TEXT BY CONVERSATION TIME | BE READY TO PLAY VOICE AFTER DETECTION OF RAPID UTTERANCE |
| TIME TO MAKE CUSTOMER WAIT | DETECT "PLEASE WAIT A MINUTE" | HIGHLIGHT "PLEASE WAIT A MINUTE", BE READY TO PLAY VOICE |
| TENDENCY OF INQUIRY | DETECT PHRASE THAT IS BEING INCREASED | HIGHLIGHT CORRESPONDING PHRASE, BE READY TO PLAY VOICE |
| QUALITY CONTROL | DETECT NAMES OF GOODS THAT ARE INCREASED TOGETHER WITH "RETURNING GOODS" | HIGHLIGHT CORRESPONDING NAME OF GOODS, BE READY TO PLAY VOICE |
| ⋮ | ⋮ | ⋮ |

FIG. 3

VOICE DATA TABLE

| ID | VOICE DATA |
|---|---|
| XX | 000 |

RECOGNITION DATA TABLE

| ID | WORD | OFFSET | LENGTH | ORDER |
|---|---|---|---|---|
| XX01 | KYO(STRONG) | 3.0S | 2ms | 2 |

| ID | WORD | OFFSET | LENGTH | ORDER |
|---|---|---|---|---|
| XXΔ1 | KYO(TODAY) | 3.0S | 2ms | 1 |
| XXΔ2 | WA(IS) | 3.2S | 1ms | 1 |
| XXΔ3 | TENKI(WEATHER) | 3.3S | 3ms | 1 |
| XXΔ4 | GA | 3.6S | 1ms | 1 |
| XXΔ5 | YOI(NICE) | 3.7S | 2ms | 1 |

ADDITIONAL INFORMATION TABLE

| ID | OPERATOR | CUSTOMER NAME | ANSWER STARTING DATE AND TIME | ANSWER ENDING DATE AND TIME |
|---|---|---|---|---|
| XX | YYY | ZZZ | 0/0 0:0 | 0/0 0:0 |

F I G. 10
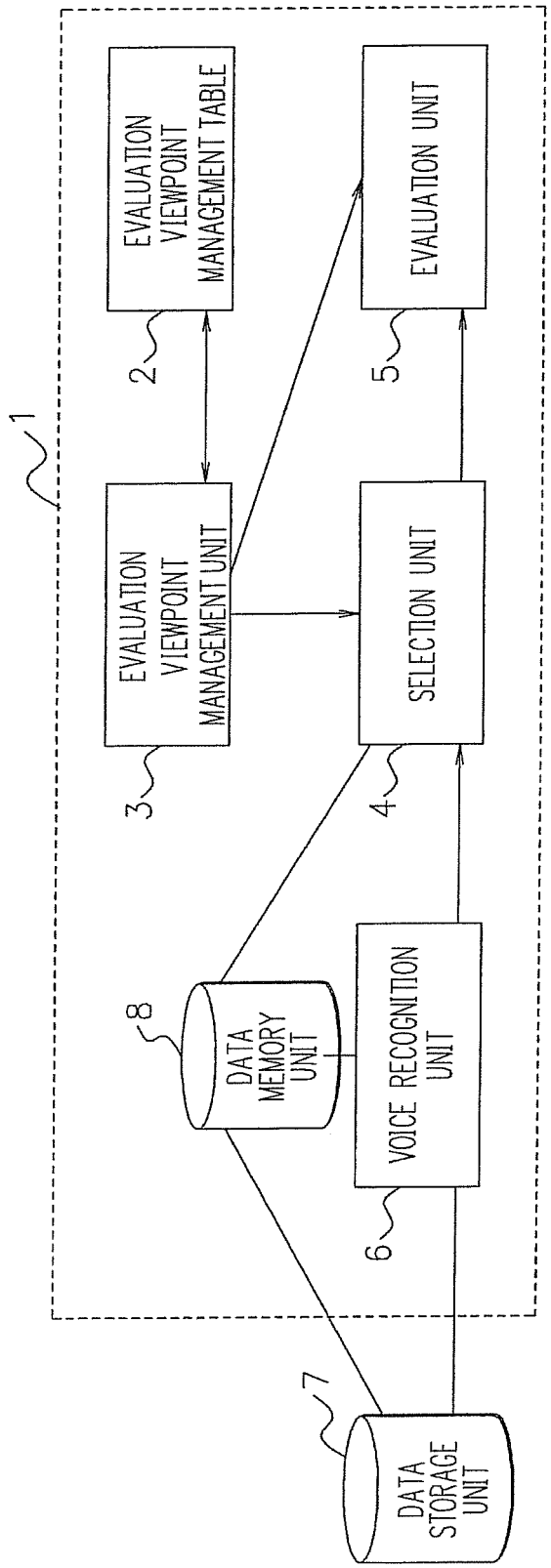

F I G. 12
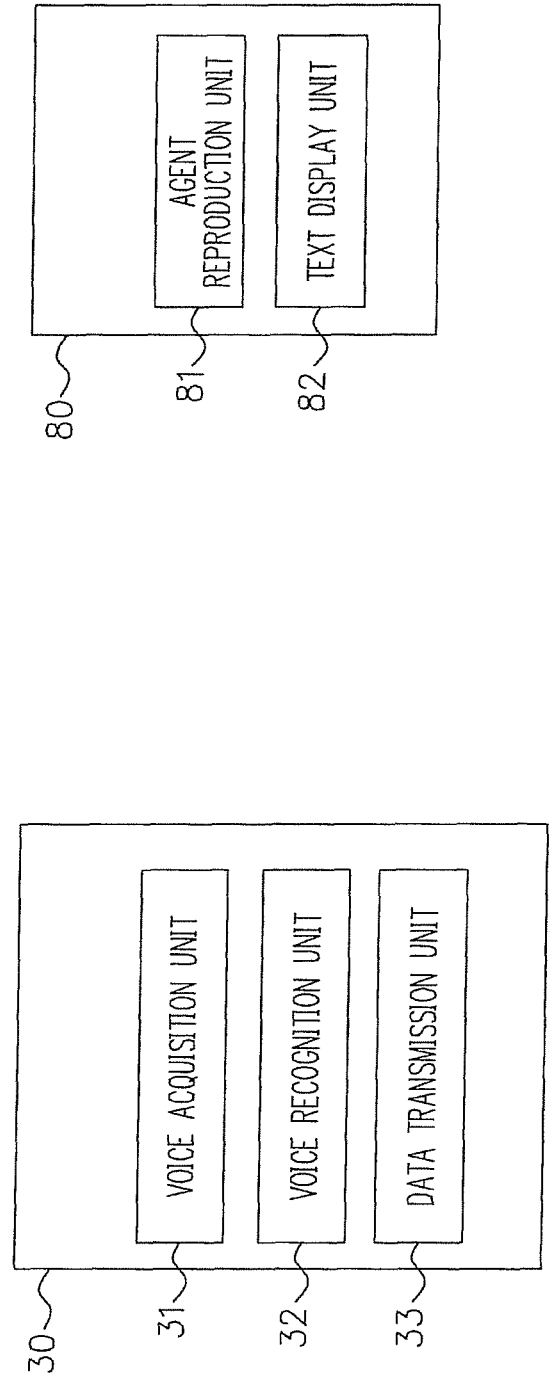

MONITORING DEVICE, EVALUATION DATA SELECTING DEVICE, AGENT EVALUATION DEVICE, AGENT EVALUATION SYSTEM, AND PROGRAM

TECHICAL FIELD

The present invention relates to a technique for evaluating utterance, such as conversation, of a person answering to a customer during an answer.

BACKGROUND ART

In the past, a center, which is called as a contact center or a call center, has received telephone inquiries from customers and answered the telephone inquiries.

At the contact center, for example, a few supervisors monitor answering manners of several hundred operators and periodically evaluate skill. The evaluation method includes recording voice of the telephone conversation, which is made between a customer and an operator, in a conversation recording device, and playing the voice of the telephone conversation to listen to the voice.

Meanwhile, as for the evaluation of an operator, there has been proposed the following technique. A technique, which conducts a questionnaire survey on an operator answering the phone call from a customer in a predetermined enterprise or the predetermined enterprise, includes selecting operator serving as objects of questionnaire among a plurality of operators under predetermined selection conditions; and conducting a questionnaire survey of customers who have had a conversation with the selected operators, by using an answering machine after the completion of conversation with the operator. Accordingly, it is possible to conduct a questionnaire survey on the impression about the operator who answers the phone call from a customer at the contact center with small effort and low cost. Therefore, it is possible to obtain high-quality survey result (for example, see Japanese Patent Application Laid-open No. 2004-229014).

DISCLOSURE OF THE INVENTION

Problems to be Solved by the Invention

However, the above-mentioned technique in the conventional art has the following problems.

The technique disclosed in Japanese Patent Application Laid-open No. 2004-229014 can evaluate an operator from the position of a customer who is a third person, but is not useful for a supervisor who is a manager of the enterprise to evaluate an operator.

In general, in order to fairly evaluate an operator or the like, evaluation is performed after the reproduction and listening of the entire conversation at the time of every answer of the operator. However, a large amount of recorded voice data is accumulated in the conversation recording device. For this reason, a supervisor appropriately extracts sample data used for evaluation from the large amount of recorded voice data, evaluates an operator on the basis of conversation corresponding to the limited answering time. Therefore, there is a limitation on ensuring the effectiveness of the result of the evaluation after efficient evaluation.

The present invention has been made in consideration of the above-mentioned circumstances, and an object of the present invention is to allow a person in charge of the supervision of agents, such as a supervisor, to efficiently evaluate utterance such as conversation of agents while ensuring the effectiveness of the result of the evaluation.

Means for Solving the Problems

In order to achieve the above-mentioned object, the present invention provides a monitoring device. The monitoring device includes selection means and evaluation means. The selection means selects voice data and/or its recognition data used in agent evaluation, by applying a selection operation corresponding to evaluation viewpoint information stored in evaluation viewpoint storing means, from call logging data that includes at least the voice data obtained by monitoring utterance, the recognition data generated from the voice data by voice recognition, and correspondence relationship data between the voice data and its recognition data. The evaluation means plays the voice data and/or displays the recognition data, which are selected by the selection means and used in the agent evaluation, by applying an output operation corresponding to the evaluation viewpoint information stored in the evaluation viewpoint storing means.

Further, the present invention provides an evaluation data selecting device. The evaluation data selecting device selects voice data and/or its recognition data used in agent evaluation, by applying a selection operation corresponding to evaluation viewpoint information stored in evaluation viewpoint storing means, from call logging data that includes at least the voice data obtained by monitoring utterance, the recognition data generated from the voice data by voice recognition, and correspondence relationship data between the voice data and its recognition data.

Furthermore, the present invention provides an agent evaluation device. The agent evaluation device plays voice data and/or displays recognition data, which are used in agent evaluation, by applying an output operation corresponding to evaluation viewpoint information stored in the evaluation viewpoint storing means, from call logging data that includes at least the voice data obtained by monitoring utterance, the recognition data generated from the voice data by voice recognition, and correspondence relationship data between the voice data and its recognition data.

In addition, the present invention provides an agent evaluation system that includes a server for selecting evaluation data and one or more client terminals. The server selects voice data and/or its recognition data used in agent evaluation, by applying a selection operation corresponding to evaluation viewpoint information stored in evaluation viewpoint storing means, from call logging data that includes at least the voice data obtained by monitoring utterance, the recognition data generated from the voice data by voice recognition, and correspondence relationship data between the voice data and its recognition data. The client terminals play the voice data and/or display the recognition data used in the agent evaluation, by applying an output operation corresponding to the evaluation viewpoint information stored in the evaluation viewpoint storing means.

Further, the present invention provides an agent evaluation system that includes a customer's phone, an operator's phone, an operator device, a file server, an evaluation data selecting device, an evaluation viewpoint management device, and an agent evaluation device. The operator device transmits call logging data, which includes at least voice data of a contact center obtained by monitoring conversation performed between a customer and an operator using the customer's phone and the operator's phone, recognition data generated from the voice data by voice recognition, and correspondence relationship data between the voice data and its recognition data, to the file server. The evaluation data selecting device selects the voice data and/or its recognition data used in agent evaluation, by applying a selection operation corresponding to evaluation viewpoint information stored in evaluation viewpoint storing means of the evaluation viewpoint management device, from the call logging data stored in the file server. The agent evaluation device plays the voice data and/or displays the recognition data, which are selected by the evaluation data selecting device and used in the agent evaluation, by applying an output operation corresponding to the evaluation viewpoint information stored in the evaluation viewpoint storing means of the evaluation viewpoint management device.

Effect of the Invention

According to the present invention, it is possible to efficiently evaluate utterance while ensuring the effectiveness of the result of the evaluation.

BEST MODE FOR CARRYING OUT THE INVENTION

A first exemplary embodiment of the present invention will be described in detail below with reference to drawings. Meanwhile, the same reference numerals are given to common portions of drawings.

Referring to FIG. 1, a monitoring device 1 according to the present embodiment is an information processing device used by a supervisor who is an administrator playing a role to evaluate the answering skill of operators at a contact center. The monitoring device 1 includes a selection unit 4, an evaluation viewpoint management unit 3, an evaluation viewpoint management table 2, and an evaluation unit 5.

The monitoring device 1 is an information processing device, such as a personal computer or a workstation, which is used by a supervisor. The monitoring device includes known other components, such as an operating-input unit, a ROM (Read Only Memory), a RAM (Random Access Memory), a communication interface, a HD (Hard Disk), and a CPU (Central processing unit).

Meanwhile, the operating-input unit includes a keyboard, a mouse, and the like, and outputs an operating signal corresponding to the operation of the keyboard or the mouse to the CPU. A program, which is in charge of the basic control of each component in the device, is stored in the ROM. Further, the RAM is used as a work area of the CPU, and temporarily stores a program executed by the CPU or various data. The communication interface is connected to a network, and controls data communication performed between other devices and the monitoring device.

The HD stores various kinds of software for controlling its own devices, such as an operating system. Further, predetermined databases, such as the evaluation viewpoint management table 2 and a customer database, may be stored in the HD.

In the evaluation viewpoint management table 2, for example, data shown in FIG. 2 are stored, and the "evaluation viewpoint", the "operation of the selection unit 4", and the "operation of the evaluation unit 4" are associated with one another. Meanwhile, the evaluation viewpoint management table 2 corresponds to evaluation viewpoint storing means. However, the evaluation viewpoint storing means may not necessarily be in the form of a table, and may be embodied by known hardware or software.

The evaluation viewpoint management unit 3 functions to search the evaluation viewpoint management table 2 on the basis of "evaluation viewpoint" information, to acquire the "operation of the selection unit 4" or the "operation of the evaluation unit 5" that corresponds to the "evaluation viewpoint", and to transmit the operation to the selection unit 4 and/or the evaluation unit 5. Further, the evaluation viewpoint management unit may function to perform maintenance and management, such as the addition, update, and deletion of the data stored in the evaluation viewpoint management table 2. Meanwhile, a supervisor performs an operation such as pressing a button corresponding to a desired "evaluation viewpoint" from a list displayed on a predetermined display, so that the evaluation viewpoint management unit 3 acquires the "evaluation viewpoint" information.

The selection unit 4 of the monitoring device 1 functions to read recognition data that are voice data or its recognition result thereof, and to select objects to be evaluated for performing operator's evaluation. The selection unit 4 acquires the recognition data from a data storage unit 7 provided outside of the monitoring device 1. The recognition data are generated from operator's voice data stored in the data storage unit 7 by a voice recognition unit 6. Meanwhile, voice data and the recognition data thereof are stored in the data storage unit 7.

In this case, as a result of the voice recognition, the recognition data is composed of text data acquired from a first candidate that comprehensively has the highest reliability of each word and plausibility in connecting words. Meanwhile, the recognition data may include a plurality of recognition result candidates of the voice recognition acquired by a publicly known technique during the voice recognition, a plurality of recognition result candidates that have become other candidates based on the reliability representing the possibility of the recognition result, or reliability. Further, the voice data may include silent hour and customer's utterance as well as operator's utterance.

Further, for example, as shown in FIG. 3, the recognition data generated by the voice recognition unit 6 may correspond to the voice data serving as sources, and may be stored together with data used to identify a customer or date and time of answer. In this case, the recognition data may correspond to the voice data by a sentence unit, a word unit, or a letter unit as well as a large recognition unit such as the entire conversation between a customer and an agent. Therefore, for example, it is possible to understand that the voice data between a few seconds corresponds to a certain word.

The selection unit 4 selects the recognition data by applying the "operation of the selection unit 4" acquired with reference to the evaluation viewpoint management table 2 through the evaluation viewpoint management unit 3 and corresponds to the "evaluation viewpoint". The "operation of the selection unit 4" is largely classified into a pattern for detecting a specific keyword (type 1), a pattern for detecting an unspecific phrase (type 2), a pattern for detecting a time-series pattern (type 3), and a pattern for detecting the change in increase and decrease of the same phrase for a predetermined period of time.

The evaluation unit 5 functions to play the voice of the voice data serving as sources of the recognition data, and to display the recognition data in the form of a text. The evaluation unit 5 acquires the recognition data selected by the selection unit 4 and the voice data serving as sources of the recognition data, and outputs data by applying the "operation of the evaluation unit 5" acquired with reference to the evaluation viewpoint management table 2 through the evaluation viewpoint management unit 3 and corresponds to the "evaluation viewpoint" at the time of the selection. While visually confirming the contents of the text displayed on a display unit such as a liquid crystal screen shown in FIG. 4, a supervisor performs evaluation by playing phone call voice from a specific anxious portion and auditorily confirming the voice. Meanwhile, the text is useful in generally understanding the contents of the conversation for a short time, and the voice is useful in determining intonation or the adequacy of utterance during the conversation. However, both the text and the voice do not necessarily need to be used together, and only one of them may be used to perform the evaluation.

The flow of an agent evaluation process of the present embodiment will be described below. In the following description, the agent evaluation process is classified into a process performed until the phone call voice is stored as the recognition data, a process for selecting evaluation files, and a process for performing evaluation. Meanwhile, it is assumed that a plurality of operators answer telephone inquiries from customers at a contact center, and at least one supervisor evaluates the operators in consideration of call logs.

At the beginning, the flow of the process performed until the phone call voice is stored as the recognition data will be described with reference to FIG. 5.

First, a customer, who intends to inquire of a contact center, makes a phone call from a customer's phone to an operator's phone (S501).

Then, an operator receives a phone call through the operator's phone, and makes an answer, such as having a necessary conversation with the customer (S502).

A voice recorder stores conversation, which is made between the operator and the customer at the time of the answer in the step S502, in the data storage unit 7 as voice data (S503). Data, which are used to identify a customer or date and time of answer, may be added to the voice data.

The voice recognition unit 6 performs the voice recognition of the voice data stored in the step S503, and generates the recognition data thereof (S504). As described above, the recognition data may include a plurality of recognition result candidates of the voice recognition acquired by a publicly known technique during the voice recognition, a plurality of recognition result candidates that have become other candidates based on the reliability representing the possibility of the recognition result, or reliability. Therefore, as a result of the voice recognition, the recognition data may include a plurality of data having become other candidates, as well as the text data acquired from a first candidate that comprehensively has the highest reliability of each word and plausibility in connecting words.

The recognition data generated by the voice recognition unit 6 are stored in the data storage unit 7 so as to correspond to the voice data serving as sources of the recognition data. In this case, FIG. 3 shows an example of the data structure stored in the data storage unit 7.

Referring to FIG. 3, a voice data table, a recognition data table, and an additional information table exist in the data storage unit 7. IDs that are identification information used to uniquely identify the voice data, and names of the voice data are stored in the voice data table. Further, "offset" information that represents a starting position of every word of the voice data, "length" information that represents the length of the word, and "order" information that represents a candidate order based on the reliability of the recognition result of the word are stored in the recognition data table so as to be associated with IDs corresponding to the IDs of the voice data that serve as sources for generating the recognition data. For example, in FIG. 3, with respect to words, such as "Kyo (means today)", "wa (means is)", "tenki (means weather)", "ga (no word corresponds to this in the sentence below)", and "yoi (means nice) of the recognition data based on the voice data, "Kyo wa tenki ga yoi (means Today is nice weather)", information that "Kyo (means today)" exists from 3 seconds for 2 ms. in the voice data and the candidate order of "Kyo (means today)" is the first priority as the recognition result is stored in one recognition data table when thinking about "Kyo". Meanwhile, if "Kyo (means strong)", which is a homophone of "Kyo (means today)" is the next candidate of "Kyo", the homophone "Kyo (means strong)" is stored as a second candidate.

Operator identification information about the data, information about customer names, answer starting date and time information, answer ending date and time information, and the like are stored in the additional information table so as to correspond to the IDs of the voice data and its recognition data. Meanwhile, the information about customer names may be linked with the above customer database.

Next, a process for selecting recognition data for every "evaluation viewpoint" and a process for performing evaluation will be described. First, the flow of the process of each of the patterns largely classified as the "operation of the selection unit 4" will be described. After that, the "operation of the evaluation unit 5" will be generally described. Finally, the process for selecting recognition data for every "evaluation viewpoint" and the process for performing evaluation will be described in detail.

As described above, the "operation of the selection unit 4" includes the pattern for detecting a specific keyword (type 1), the pattern for detecting an unspecific phrase (type 2), the pattern for detecting a time-series pattern (type 3), and the pattern for detecting the change in increase and decrease of the same phrase for a predetermined period of time (type 4).

In more detail, the pattern for detecting a specific keyword (type 1) includes a pattern for detecting that a specific keyword does not appear (type 1-1-1), a pattern for detecting that a specific keyword appears (type 1-1-2), and a pattern for detecting that a specific keyword appears frequently (type 1-1-3). The pattern for detecting a specific keyword further includes a pattern for detecting only a part of specific keywords appears (type 1-2-1), and a pattern for detecting that both keywords appear (type 1-2-2). The pattern for detecting a specific keyword still further includes a pattern for detecting whether a specific keyword appears after a specific operation (type 1-3).

Further, the pattern for detecting an unspecific phrase (type 2) is to detect that the same phrase repeatedly appears.

The pattern for detecting a time-series pattern (type 3) includes a pattern for detecting the speed of conversation from the number of letters per unit time (type 3-1), a pattern for detecting long conversation (type 3-2), and a pattern for detecting silent time after a specific keyword (type 3-3).

The pattern for detecting the change in increase and decrease of the same phrase for a predetermined period of time (type 4) includes a pattern for detecting the increase and decrease of a specific keyword of a specific operator for a predetermined period of time (type 4-1). The pattern for detecting the change in increase and decrease of the same phrase for a predetermined period of time further includes a pattern for detecting a phrase of which frequency of appearance is significantly increased or decreased for a predetermined period of time (type 4-2-1), and a pattern for detecting the phrase, which appears with a specific keyword and of which frequency of appearance is significantly increased or decreased for a predetermined period of time (type 4-2-2).

The flow of the process of each of the patterns largely classified as the "operation of the selection unit 4" will be described hereinafter. Meanwhile, as described above, the recognition data may include a plurality of recognition result candidates of the voice recognition acquired by a publicly known technique, or the reliability representing the possibility of the recognition result. Therefore, the recognition data may include a plurality of data having become the next candidates, as well as a text file acquired from a first candidate that comprehensively has the highest reliability of each word and plausibility in connecting words in voice data. The following selection process includes a case that a plurality of data is selected and compared.

At the beginning, the pattern for detecting that a specific keyword does not appear (type 1-1-1) of the pattern for detecting a specific keyword (type 1) will be described. Referring to FIG. 6, first, the selection unit 4 reads one line stored in the recognition data table of the data storage unit 7 (S601).

Then, whether a specific keyword is included in each of the recognition data is determined (S602). In this case, the keyword may be input by a supervisor whenever the evaluation is performed, and may be referred to a keyword table that stores a series of keyword collection data registered in advance. The input of the keyword is not particularly limited. Further, the keyword may be directly described in the evaluation viewpoint management table, and may be linked with another keyword table.

If the specific keyword is not included in each of the recognition data (S602/Yes), whether the data read from the recognition data table is the last line is determined (S603).

If the read data is not the last line (S603/NO), a value of a predetermined counter is increased by 1, a process returns to the step S601, a read position is moved to the next line, and the process is repeated.

Meanwhile, if the read data is the last line (S603/Yes), the recognition data is decided as recognition data used in agent evaluation (S604).

Except for what is particularly shown in FIG. 6, the description of processes when conditions are not met is omitted.

Next, the pattern for detecting that a specific keyword appears (type 1-1-2), and the pattern for detecting that a specific keyword appears frequently (type 1-1-3) of the pattern for detecting a specific keyword (type 1) will be described. Referring to FIG. 7, first, the selection unit 4 reads one line stored in the recognition data table of the data storage unit 7 (S701).

Then, whether a specific keyword is included in each of the recognition data is determined (S702). In this case, the keyword may be input by a supervisor whenever the evaluation is performed, and may be referred to a keyword table that stores a series of keyword collection data registered in advance. The input of the keyword is not particularly limited. Further, the keyword may be directly described in the evaluation viewpoint management table, and may be linked with another keyword table.

If the specific keyword is included in each of the recognition data (S702/Yes), whether the keyword appears n or more times (n is an arbitrary positive integer and is a set upper limit) is determined (S703). In this case, a value directly described in the evaluation viewpoint management table 2 may be used as the upper limit, or a value set by a supervisor may be used as the upper limit. Further, different upper limits may be used for different keywords.

If the keyword appears less than n times (n is an arbitrary positive integer and is a set upper limit) (S703/NO), a value of a predetermined counter is increased by 1, a process returns to the step S701, a read position is moved to the next line, and the process is repeated.

Meanwhile, if the keyword appears n or more times (n is an arbitrary positive integer and is a set upper limit) (S703/Yes), the recognition data is decided as recognition data used in the agent evaluation (S704).

In addition, after the keyword is searched for until the last recognition data, if the keyword appears less than n times (n is an arbitrary positive integer and is a set upper limit), the recognition data may be decided as recognition data used in the agent evaluation.

Meanwhile, except for what is particularly shown in FIG. 7, the description of processes when conditions are not met is omitted.

Further, the pattern for detecting only a part of specific keywords appears (type 1-2-1), the pattern for detecting that both keywords appear (type 1-2-2), and the pattern for detecting whether a specific keyword appears after a specific operation (type 1-3) will be described in specific examples to be described below.

In the pattern for detecting that the same phrase repeatedly appears of the pattern for detecting an unspecific phrase (type 2), the "phrase" is different from a "keyword" that is a phrase registered in advance, and includes phrases that are not registered in advance. However, since the determination of whether the same "phrases" are included in each of the recognition data can be easily performed by well-known various techniques, it is possible to apply the flow shown in FIG. 7 that relates to the above-mentioned process about the "keyword" in a similar way. For this reason, the description will not be repeated.

Next, the pattern for detecting the speed of conversation from the number of letters per unit time (type 3-1), the pattern for detecting long conversation (type 3-2), and the pattern for detecting silent time after a specific keyword (type 3-3) of the pattern for detecting a time-series pattern (type 3) will be described. However, it is possible to detect corresponding recognition data by using the "answer starting date and time information" and the "answer ending date and time information" of the additional information table, or using "offset" information and "length" information of the recognition data table. The details will be described in specific examples to be described below.

After that, the pattern for detecting the change in increase and decrease of the same phrase for a predetermined period of time (type 4) will be described. However, it is possible to detect corresponding recognition data by using the "answer starting date and time information" and the "answer ending date and time information" of the additional information table and the process of the above-mentioned "type 1". The details will be described in specific examples to be described below.

Then, the "operation of the evaluation unit 5" will be generally described below. First, as the assumption, the evaluation unit 5 acquires the recognition data, which are selected by the selection unit 4 and are decided as recognition data used in the agent evaluation, and the voice data corresponding to the recognition data, from the data storage unit 7. Further, the evaluation unit acquires the "evaluation viewpoint" information, and the information about the "operation of the evaluation unit 5" associated with the "evaluation viewpoint" information, from the evaluation viewpoint management unit 3.

The evaluation unit 5 displays the recognition data on a display unit such as a liquid crystal screen in the form of a text by the function of displaying the recognition data in the form of a text. A portion of predetermined keywords may be marked or highlighted to attract supervisor's attention. Further, a filler such as "Uh" may be omitted because it makes reading the text be difficult, or a portion of the text where the reliability of voice recognition is low may not be displayed.

Furthermore, as described above, the recognition data may include a plurality of recognition result candidates of the voice recognition acquired by a publicly known technique during the voice recognition, a plurality of recognition result candidates that have become other candidates based on the reliability representing the possibility of the recognition result, or reliability. Therefore, as a result of the voice recognition, when the recognition data include a plurality of data having become other candidates as well as the text data acquired from a first candidate that comprehensively has the highest reliability of each word and plausibility in connecting words, for example, when the phrase to be highlighted is another candidate, the phrase may be displayed using parentheses.

The evaluation unit 5 plays phone call voice on the basis of the voice data from a specific starting point from which the phone call voice designated from the text is played, by the function of playing the voice of the voice data serving as sources of the recognition data. A cursor is automatically ready at the front portion of a keyword that corresponds to the "evaluation viewpoint" at the time of selection by the selection unit 4, so that the starting point may be designated. Alternatively, a supervisor understands the contents of the conversation of the operator while visually confirming the contents of the text displayed on the display unit, and then moves a cursor to the displayed text corresponding to the anxious portion of the conversation at the time of the answer, so that the starting point from which the phone call voice is played may be designated. This is possible because the "offset" information of the recognition data table is linked with the corresponding portion of the voice data. Meanwhile, it is natural that the reproduction speed of the voice data may be preferably changed. In this case, the played portion of the text displayed on the display unit may be highlighted in synchronization with the played portion of the voice data, or a screen may be scrolled in synchronization with the played portion.

In this way, it is possible to listen to the voice from the designated portion while reading the text. Therefore, it is possible to easily understand summaries by reading the text, and it is possible to quickly listen to a specific portion by designating the corresponding portion of the text. Meanwhile, both the text and the voice do not necessarily need to be used together at the time of evaluation, and only one of them may be used to perform the evaluation.

Next, a process for selecting individual recognition data and a process for performing evaluation will be described in detail for each of detailed "evaluation viewpoints" shown in FIG. 2.

As "evaluation viewpoints" corresponding to the pattern for detecting that a specific keyword does not appear (type 1-1-1) of the pattern for detecting a specific keyword (type 1), there may be "basic of answer (introductory part)", "basic of answer (for corporation)", and "basic of answer (closing part)".

First, when a "evaluation viewpoint" is the "basic of answer (introductory part)", the operation of the selection unit 4 detects that an operator does not say keywords such as introductory greetings, for example, "Thank you for waiting" and operator's affiliation or name in accordance with the flow of FIG. 7. Meanwhile, the operator identification information of the additional information table may be referred. Further, the operation of the evaluation unit 5 makes a cursor be ready at the front portion of the displayed text in order to play the front portion of the conversation.

Next, when a "evaluation viewpoint" is the "basic of answer (for corporation)", the operation of the selection unit 4 detects the name of a corporation from customer's voice and detects that operator's voice does not include keywords such as "We always appreciate your business", if the corporation is a client, in accordance with the flow of FIG. 7. Further, in order to play the portion of the customer's voice after the utterance including the name of the corporation, the operation of the evaluation unit 5 makes a cursor be ready at the front portion of the utterance of the displayed text.

Next, when a "evaluation viewpoint" is the "basic of answer (closing part)", the operation of the selection unit 4 detects that operator's voice does not include keywords such as "XX in charge have spoken" in accordance with the flow of FIG. 7 described above. Meanwhile, the operator identification information of the additional information table may be referred. Further, in order to play the conversation corresponding to last 30 seconds, the operation of the evaluation unit 5 makes a cursor be ready at a position, which corresponds to the last 30 seconds from the end of the conversation, in the displayed text with reference to the answer ending date and time information of the additional information table, "offset" and "length" information of the recognition data table, and the like. According to these "evaluation viewpoints", the recognition data, which are call logs of an operator that does not say predetermined phrases or essential matters prescribed in a manual or the like during the answer, are selected. Therefore, a supervisor can efficiently evaluate an operator having call logs that seem to include some kinds of problems.

As "evaluation viewpoints" corresponding to the pattern for detecting that a specific keyword appears (type 1-1-2) of the pattern for detecting a specific keyword (type 1), there may be "occurrence of trouble", "rude word", "transmission to other section", and "customer satisfaction".

First, when a "evaluation viewpoint" is the "occurrence of trouble", the operation of the selection unit 4 detects the appearance of keywords, such as "I'm sorry" and "Please hang up the phone", in accordance with the flow of FIG. 7. Further, the operation of the evaluation unit 5 highlights the keywords, such as "I'm sorry" and "Please hang up the phone", by boldface, underlines, highlights, flashing, color, and the like. Alternatively, the operation of the evaluation unit makes a cursor be ready at the front portion of the keyword of the displayed text in order to play the corresponding keyword in the form of voice.

Next, when a "evaluation viewpoint" is the "rude word", the operation of the selection unit 4 detects the appearance of keywords, such as "fool" and "claimer", in accordance with the flow of FIG. 7. Further, the operation of the evaluation unit 5 highlights the keywords, such as "fool" and "claimer", by boldface, underlines, highlights, flashing, color, and the like. Alternatively, the operation of the evaluation unit makes a cursor be ready at the front portion of the keyword of the displayed text in order to play the corresponding keyword in the form of voice.

Next, when a "evaluation viewpoint" is the "transmission to other section", the operation of the selection unit 4 detects the appearance of keywords, for example, "exempt from" and "transmission", or the appearance of the names of articles exempt from a range of guarantee or the like in accordance with the flow of FIG. 7. Further, the operation of the evaluation unit 5 highlights the keywords such as "exempt from" that easily cause troubles or the names of articles that are exempt from a range of guarantee or the like, by boldface, underlines, highlights, flashing, color, and the like. Alternatively, the operation of the evaluation unit makes a cursor be ready at the front portion of the keyword of the displayed text in order to play the corresponding keyword in the form of voice, or highlights the formal words for guiding other sections. According to this "evaluation viewpoint", identification result data, which include keywords likely to cause some kinds of troubles, are selected. Therefore, a supervisor can efficiently evaluate an operator having call logs that seem to include some kinds of problems.

Next, when a "evaluation viewpoint" is the "customer satisfaction", the operation of the selection unit 4 detects that a customer says words of appreciation such as "Thank you" while an operator answers the phone, in accordance with the flow of FIG. 7. Further, the operation of the evaluation unit 5 highlights the keywords such as "Thank you" by boldface, underlines, highlights, flashing, color, and the like. Alternatively, the operation of the evaluation unit makes a cursor be ready at the front portion of the keyword of the displayed text in order to play the corresponding keyword in the form of voice, or counts and displays the number of the thank-you words.

As a "evaluation viewpoint" corresponding to the pattern for detecting that a specific keyword appears frequently (type 1-1-3) of the pattern for detecting a specific keyword (type 1), there may be "listenability". In this case, the operation of the selection unit 4 detects the appearance of keywords, such as "Uh" and "Um", in accordance with the flow of FIG. 7. Further, the operation of the evaluation unit 5 highlights the keywords, such as "Uh" and "Um", by boldface, underlines, highlights, flashing, color, and the like. Alternatively, the operation of the evaluation unit makes a cursor be ready at the front portion of the keyword of the displayed text in order to play the corresponding keyword in the form of voice.

As a "evaluation viewpoint" corresponding to the pattern for detecting only a part of specific keywords appears (type 1-2-1) of the pattern for detecting a specific keyword (type 1), there may be "operational procedure guidance". In this case, the operation of the selection unit 4 determines whether one word and another word co-occur. For example, when an operator instructs a customer to perform re-setup, data are necessarily stored and saved. Therefore, the "re-setup" and the "backup" are defined as co-occurring words, and the appearance of the only former keyword is detected in accordance with the flow of FIG. 8. Meanwhile, when the "re-setup" is performed, a "backup" process is necessarily performed. However, even when the "backup" process is performed, the "re-setup" does not necessarily need to be performed. For this reason, the appearance of the only former keyword "re-setup" is detected.

Referring to FIG. 8, first, the selection unit 4 reads one line stored in the recognition data table of the data storage unit 7 (S801).

Then, whether the "re-setup" used as the former keyword is included in each of the recognition data is determined (S802). In this case, the keyword may be input by a supervisor whenever the evaluation is performed, and may be referred to a keyword table that stores a series of keyword collection data registered in advance. The input of the keyword is not particularly limited. Further, the keyword may be directly described in the evaluation viewpoint management table, and may be linked with another keyword table.

If the "re-setup" used as the former keyword is included in each of the recognition data (S802/Yes), whether the "backup" used as the latter keyword is included is determined (S803).

If the "backup" used as the latter keyword is not included (S803/Yes), whether the data read from the recognition data is the last line is determined (S804).

If the read data is not the last line (S804/NO), a value of a predetermined counter is increased by 1, a process returns to the step S801, a read position is moved to the next line, and the process is repeated.

Meanwhile, if the read data is the last line (S804/Yes), the recognition data is decided as recognition data used in the agent evaluation (S805).

Except for what is particularly shown in FIG. 8, the description of processes when conditions are not met is omitted.

Further, the operation of the evaluation unit 5 highlights the former keyword that has appeared, by boldface, underlines, highlights, flashing, color, and the like. Furthermore, the operation of the evaluation unit displays the latter keyword by using parentheses in order to show that the latter keyword does not have appeared. In addition, a cursor is ready at the front portion of the keyword of the displayed text in order to play the corresponding keyword in the form of voice.

As a "evaluation viewpoint" corresponding to the pattern for detecting that both keywords appear (type 1-2-2) of the pattern for detecting a specific keyword (type 1), there may be "response to emergency". In this case, the operation of the selection unit 4 determines whether one word and another word co-occur. For example, it does not matter if a phone may ring. However, if a gas alarm sounds, it is highly possible that an emergency has occurred. For this reason, an operator needs to issue an instruction to a customer. Accordingly, a predetermined instruction is set to be issued when "gas alarm" and "sounds" co-occur, and the appearance of both keywords is detected in accordance with the flow of FIG. 7. Further, the operation of the evaluation unit 5 highlights both keywords that have appeared, by boldface, underlines, highlights, flashing, color, and the like. Furthermore, the operation of the evaluation unit makes a cursor be ready at the front portion of the keyword of the displayed text in order to play the corresponding keyword in the form of voice. According to this "evaluation viewpoint", identification result data, which include keywords having a high possibility where some kinds of emergencies have occurred, are selected. Therefore, a supervisor can efficiently evaluate an operator in terms of whether an appropriate instruction is issued against an emergency.

As a "evaluation viewpoint" corresponding to the pattern for detecting whether a specific keyword appears after a specific operation (type 1-3) of the pattern for detecting a specific keyword (type 1), there may be "after making customer wait". In this case, the operation of the selection unit 4 detects that a keyword such as "Thank you for waiting" appears after putting the call on hold, in accordance with the flow of FIG. 7. Meanwhile, the hold may be detected by the press of a BGM button or a predetermined button. Further, the operation of the evaluation unit 5 highlights the keyword such as "Thank you for waiting" by boldface, underlines, highlights, flashing, color, and the like. Alternatively, the operation of the evaluation unit makes a cursor be ready at the front portion of the keyword of the displayed text in order to play the corresponding keyword in the form of voice. Further, if the keyword does not appear, the operation of the evaluation unit displays the keyword by using parentheses or makes a cursor be ready at the front portion of the portion of the conversation after the hold.

As a "evaluation viewpoint" corresponding to the pattern for detecting that the same phrase repeatedly appears of the pattern for detecting an unspecific phrase (type 2), there may be "occurrence of trouble". In this case, the operation of the selection unit 4 detects that the same word is repeated during one phone call in accordance with the flow of FIG. 7. For example, this corresponds to a case where an operator repeatedly explains several times without detecting that a customer does not understand the meaning of a word such as an "access point". Meanwhile, a search may be performed with reference to a list excluding the words that are regularly used in a usual conversation so that the words are not detected in this case. Further, the operation of the evaluation unit 5 highlights the corresponding word by boldface, underlines, highlights, flashing, color, and the like. Alternatively, the operation of the evaluation unit makes a cursor be ready at the front portion of the keyword of the displayed text in order to play the corresponding keyword in the form of voice. Further, the corresponding words may be additionally registered in a predetermined collection of keywords.

As a "evaluation viewpoint" corresponding to the pattern for detecting the speed of conversation from the number of letters per unit time (type 3-1) of the pattern for detecting a time-series pattern (type 3), there may be "rapid utterance". In this case, the operation of the selection unit 4 extracts larger one of a value, which is obtained by dividing the number of letters included in the text of the recognition data by the conversation time, and the number of letters per unit time calculated on the basis of the size of the recognition data and information such as the "setoff" and "length" of the recognition data table. Further, in order to play the voice after the detection of rapid utterance, the operation of the evaluation unit 5 makes a cursor be ready at a corresponding position in the text.

As a "evaluation viewpoint" corresponding to the pattern for detecting long conversation (type 3-2) of the pattern for detecting a time-series pattern (type 3), there may be "occurrence of trouble". In this case, the operation of the selection unit 4 counts the number of letters included in the text of the recognition data, and extracts a conversation, which has the number of letters larger than a predetermined number of letters, as a long conversation. Further, the operation of the selection unit calculates conversation time by using call starting time and call ending time of the additional information table, and extracts a long conversation. Furthermore, the operation of the selection unit extracts a conversation, which has large size of voice data, as a long conversation. In addition, the operation of the evaluation unit 5 makes a cursor be ready at a starting position of the text in order to play the entire conversation in the form of voice. According to this "evaluation viewpoint", recognition data being call logs corresponding to a long-time answer, which has a high possibility where some kinds of troubles have occurred, are selected. Therefore, a supervisor can efficiently evaluate an operator having call logs that seem to include some kinds of problems.

As a "evaluation viewpoint" corresponding to the pattern for detecting silent time after a specific keyword (type 3-3) of the pattern for detecting a time-series pattern (type 3), there may be "time to make customer wait". In this case, the operation of the selection unit 4 detects the appearance of keywords, such as "Please wait a minute" and "Could you wait 1 to 2 minutes?", in accordance with the flow of FIG. 7. Further, the operation of the evaluation unit 5 highlights the keywords such as, "Please wait a minute" and "Could you wait 1 to 2 minutes?" by boldface, underlines, highlights, flashing, color, and the like. Alternatively, the operation of the evaluation unit makes a cursor be ready at the front portion of the keyword of the displayed text in order to play the corresponding keyword in the form of voice. Further, for example, whether an answer is given within 30 seconds in the case of "Please wait a minute", and whether an answer is given within 5 minutes in the case of "Could you wait 1 to 2 minutes?" are displayed by measuring silent time.

As a "evaluation viewpoint" corresponding to the pattern for detecting the increase and decrease of a specific keyword of a specific operator for a predetermined period of time (type 4-1) of the pattern for detecting the change in increase and decrease of the same phrase for a predetermined period of time (type 4), there may be "listenability".

In this case, referring to FIG. 9, in the operation of the selection unit 4, first, the selection unit 4 determines whether data is the recognition data of a specific operator, with reference to the operator identification information of the additional information table (S901).

If the data is the recognition data of the specific operator (S901/Yes), whether the recognition data is within a predetermined period of time is determined with reference to the "answer starting date and time information" of the additional information table (S902).

If the data is the recognition data of the specific operator and the recognition data within a predetermined period of time (S902/Yes), the corresponding recognition data stored in the recognition data table on the basis of an ID is read (S903).

Further, whether a specific keyword is included in the recognition data is determined (S904). In this case, the keyword may be input by a supervisor or the like whenever the evaluation is performed, and may be referred to a series of keyword collection data registered in advance. The input of the keyword is not particularly limited. Words used as keywords are words, such as "Uh" and "Um", which obstruct the listenability and are inappropriate at the time of the answer.

If the specific keyword is included in the recognition data (S904/Yes), whether the specific keyword is increased or decreased within a predetermined period of time is determined (S905).

If the specific keyword is increased or decreased within a predetermined period of time (S905/Yes), the recognition data is decided as recognition data used in the agent evaluation (S906).

Further, the operation of the evaluation unit 5 displays a predetermined period of time and a statistical chart showing increase and decrease. Alternatively, the operation of the evaluation unit highlights keywords that are increased or decreased by boldface, underlines, highlights, flashing, color, and the like, or makes a cursor be ready at the front portion of the keyword of the displayed text in order to play the corresponding keyword in the form of voice. According to this "evaluation viewpoint", words used as keywords are words that obstruct the listenability and are inappropriate at the time of the answer. The recognition data corresponding to the call logs of an operator who continuously and repeatedly uses the words, not an operator who happens to use the words, among operators using the words which are inappropriate at the time of the answer are selected. Therefore, a supervisor can efficiently evaluate an operator having call logs that seem to include some kinds of problems in used words. Further, it is possible to confirm an effect of guiding the operator.

As a "evaluation viewpoint" corresponding to the pattern for detecting a phrase of which frequency of appearance is significantly increased or decreased for a predetermined period of time (type 4-2-1) of the pattern for detecting the change in increase and decrease of the same phrase for a predetermined period of time (type 4), there may be "tendency of inquiry". In this case, the operation of the selection unit 4 detects the appearance of a phrase, which is being increased within a predetermined period of time (recently), with reference to the "answer starting date and time information" of the additional information table in accordance with the flow of FIG. 9 that is subsequent to the step S902. Further, the operation of the evaluation unit 5 displays a predetermined period of time. Additionally, the operation of the evaluation unit highlights the phrase that is being increased by boldface, underlines, highlights, flashing, color, and the like, or makes a cursor be ready at the front portion of the keyword of the displayed text in order to play the corresponding keyword in the form of voice. According to this "evaluation viewpoint", the recognition data corresponding to the call logs that include words having recently tended to be increased are selected. Therefore, a supervisor can efficiently evaluate an operator in terms of whether a response to a new situation is appropriately made.

As a "evaluation viewpoint" corresponding to the pattern for detecting the phrase, which appears with a specific keyword and of which frequency of appearance is significantly increased or decreased for a predetermined period of time (type 4-2-2) of the pattern for detecting the change in increase and decrease of the same phrase for a predetermined period of time (type 4), there may be "quality control". In this case, the operation of the selection unit 4 detects the appearance of a phrase, which appears with a specific keyword and is being increased, with reference to the "answer starting date and time information" of the additional information table in accordance with the flow of FIG. 7. For example, if there are names of goods that are increased together with a keyword such as "returning goods", it is possible to guess that problems occur in the goods. Further, the operation of the evaluation unit 5 displays a predetermined period of time. Furthermore, the operation of the evaluation unit highlights the phrase that is being increased by boldface, underlines, highlights, flashing, color, and the like, or makes a cursor be ready at the front portion of the keyword of the displayed text in order to play the corresponding keyword in the form of voice.

As described above, according to the present embodiment, the selection unit 4 appropriately selects recognition data in accordance with the "evaluation viewpoint" information stored in the evaluation viewpoint management table 2, and the evaluation unit 5 can also output data for evaluation in accordance with the "evaluation viewpoint" information stored in the evaluation viewpoint management table 2 regardless of whether the evaluation unit is interlocked with the selection unit 4.

Meanwhile, as a result of the voice recognition, when the recognition data include a plurality of data having become other candidates as well as the text data acquired from a first candidate that comprehensively has the highest reliability of each word and plausibility in connecting words, the evaluation unit 5 may give an order of priority to the recognition data according to a predetermined standard, such as an order where the reliability of each word and the plausibility in connecting words are high, in order to display the recognition data, which are selected and decided as recognition data used in the agent evaluation, in order of priority.

For example, when the above-mentioned "evaluation viewpoint" corresponding to the pattern for detecting that both keywords appear (type 1-2-2) is "response to emergency", a situation where "a gas alarm sounds" is an emergency where the situation actually occurs. Therefore, it is supposed that at least one of the keywords, such as "gas alarm" and "sounds", is searched for in a wider range than usual. In this case, recognition data are selected from data acquired from a candidate subordinate to the first candidate, as well as the text data acquired from the first candidate that comprehensively has the highest reliability of each word and plausibility in connecting words as a result of the voice recognition. The recognition data are decided as recognition data used in the agent evaluation. When a large number of recognition data used in the agent evaluation are acquired, it may be difficult to view the recognition data if the evaluation unit 5 displays the entire recognition data. The evaluation unit 5 may give an order of priority to the recognition data, which are used in the agent evaluation, according to a predetermined standard such as an order where the reliability of each word and the plausibility in connecting words are high, for example, may display only the recognition data corresponding to first to third candidates.

Further, when a phrase to be highlighted is other candidate, the phrase is displayed using parentheses. In this case, when recognition data used as a single object to be evaluated include a large number of words, such as "bangs" and "passes", similar to "sounds", it may be difficult to view the recognition data if the evaluation unit 5 displays the entire recognition data using parentheses. The evaluation unit 5 may give an order of priority to each of words of the recognition data, which are used in the agent evaluation, according to a predetermined standard such as an order where the reliability of each word and the plausibility in connecting words are high, for example, may display only the words corresponding to second to fourth candidates by using parentheses.

Furthermore, the evaluation unit 5 may evaluate the quality of utterance by checking grammar, or may evaluate the quality of the listenability of utterance by using a recognition rate of a device for phone call voice. In addition, voice data and its recognition data of an answer example, which is used as a sample of an answer where high-quality utterance is performed, may be distributed to devices used by all of operators or operators whose answers are necessary to be improved.

Further, the evaluation unit 5 may function to provide a "tag" to an arbitrary portion of the displayed text. Accordingly, a supervisor can again play and listen to the voice data of the corresponding portion later by using the "tag", or can show a third person the text to which the "tag" is provided.

Furthermore, the evaluation unit 5 may function to search for letters or words in the text corresponding to an arbitrary portion of the displayed text. Accordingly, it is possible to search for recognition data having similar contents.

Further, the evaluation unit 5 may have a step of linking actual voice with an "evaluation check sheet" or a "report" displayed on a screen of a predetermined device. For example, when repair needs and a "repair" item of the "evaluation check sheet" or the "report" is checked, voice data of the conversation between an operator and a customer may be linked so as to be played by the operation such as clicking a predetermined icon.

In addition, the monitoring device 1 may further include an operator recognition unit, which specifies a speaker by using speaker's voiceprint and the like, in order to identify an operator. The reason for this is that it is necessary to identify an operator when several operators use the same seat due to shift work. Meanwhile, an operator may be identified by the login using a specific ID.

A second exemplary embodiment of the present invention will be described below. Referring to FIG. 10, the second exemplary embodiment is different from the first exemplary embodiment in that an agent evaluation device according to the present embodiment includes a data memory unit 8 and a voice recognition unit 6 for acquiring the operator's voice data stored in the data storage unit 7 and generating recognition data from the voice data as recognition result in addition to the structure of the monitoring device 1 according to the first exemplary embodiment. Meanwhile, voice data is stored in the data storage unit 7.

The data storage unit 8 stores correspondence relationship data between voice data, which serve as sources of the recognition data generated by the voice recognition unit 6 and the recognition data stored in the data storage unit 7, and the recognition data.

Further, the selection unit 4 of the monitoring device 1 reads the recognition data from the data storage unit 8 that stores the recognition data generated by the voice recognition unit 6, and selects recognition data that is an object to be evaluated. The object to be evaluated is used for a supervisor to evaluate an operator by visually confirming the displayed text or playing the phone call voice.

A third exemplary embodiment of the present invention will be described below. The third exemplary embodiment is different from the first exemplary embodiment in that an evaluation data selecting device according to the present embodiment is composed of the selection unit 4, the evaluation viewpoint management unit 3, and the evaluation viewpoint management table 2 of the monitoring device 1 according to the first exemplary embodiment and does not include the evaluation unit 5.

According to the present embodiment, the process until the selection of the recognition data in the first exemplary embodiment is performed, and the output of the selected data used for evaluation is embodied in an individual information processing device. However, it is possible to appropriately select data in accordance with the "evaluation viewpoint" information stored in the evaluation viewpoint management table 2.

A fourth exemplary embodiment of the present invention will be described below. The fourth exemplary embodiment is different from the first exemplary embodiment in that an agent evaluation device is composed of the evaluation viewpoint management unit 3, the evaluation viewpoint management table 2, and the evaluation unit 5 of the monitoring device 1 according to the first exemplary embodiment and does not include the selection unit 4.

According to the present embodiment, only a process, which is involved with the output of the recognition data used for evaluation in the first exemplary embodiment, is performed, and the selection of the recognition data is embodied in an individual information processing device. However, it is possible to appropriately output data in accordance with the "evaluation viewpoint" information stored in the evaluation viewpoint management table 2.

A fifth exemplary embodiment of the present invention will be described below. An agent evaluation system according to the present embodiment uses the evaluation data selecting device according to the third exemplary embodiment as a server, and uses the agent evaluation device according to the fourth exemplary embodiment as a client terminal that has access to the server.

According to the present embodiment, a client terminal used by each of a plurality of supervisors has access to a server that performs the process until the selection of the recognition data in the first exemplary embodiment. Therefore, it is possible to output on the client side appropriate data, which are selected in accordance with the "evaluation viewpoint" information, which is unitarily stored in the evaluation viewpoint management table 2 on the server side.

A sixth exemplary embodiment of the present invention will be described in detail below with reference to drawings. Referring to FIGS. 11 and 12, an agent evaluation system according to the present embodiment includes a customer's phone 10, an operator's phone 20, an operator device 30, a management server 40, a file server 50, an evaluation data selecting device 60, a evaluation viewpoint management device 70 including a evaluation viewpoint management table, and an agent evaluation device 80. The operator device 30, the management server 40, the file server 50, the evaluation data selecting device 60, the evaluation viewpoint management device 70, and the agent evaluation device 80 are operated by program control, and are connected to one another through a network 100. The network 100 may be an arbitrary network, and may be, for example, an optical fiber, an Internet, a public line, a LAN (Local Area Network), an ADSL (Asymmetric Digital Subscriber Line), or the like. Meanwhile, a wire communication method or a wireless communication method may be used as a communication method.

The customer's phone 10 and the operator's phone 20 are known phones connected to each other through a public network. Meanwhile, the phone is not limited to a fixed telephone, and may be a mobile phone.

The operator device 30, the management server 40, the file server 50, the evaluation data selecting device 60, the evaluation viewpoint management device 70, and the agent evaluation device 80 are commonly embodied by an information processing device, such as a personal computer and a workstation, and include, for example, an operating-input unit, a ROM (Read Only Memory), a RAM (Random Access Memory), a communication interface, a HD (Hard Disk), and a CPU (Central Processing Unit). They are connected to one another through a bus.

The operating-input unit includes a keyboard, a mouse, and the like, and outputs an operating signal corresponding to the operation of the keyboard or the mouse to a CPU. A program, which is in charge of the basic control of each component of the device, is stored in the ROM. Further, the RAM is used as a work area of the CPU, and temporarily stores a program executed by the CPU or various data.

The communication interface is connected to the network 100, and controls data communication performed between other devices and the monitoring device.

The HD stores various kind of software for controlling its own devices, such as an operating system.

In addition, the characteristics of the devices will be described. First, the operator device 30 is an information processing device used by an operator at a contact center, and is connected to a voice recorder that is an exemplary embodiment of a voice acquisition unit 31. The conversation made between the operator and the customer at the time of the answer is recorded in the voice recorder, and recognition data are generated from voice data at the voice recognition unit 32. A data transmission unit 33 makes the recognition data, which are generated at the voice recognition unit 32, correspond to voice data serving as sources. Further, the data transmission unit adds data, which are used to identify a customer or date and time of answer, to the voice data, and transmits the voice data to the file server 50. Meanwhile, a distribution device for distributing incoming calls may be connected to the operator device 30.

Next, the management server 40 is an information processing device that is in charge of the management of a system in the contact center, and may include a customer database and the like.

The file server 50 is an information processing device that stores and manages various data. The file server receives the recognition data generated at the voice recognition unit 32 of the operator device 30, the voice data that correspond to the recognition data and are made while an operator answers the phone, and data used to identify a customer or date and time of answer, from the data transmission unit 33 of the operator device 30.

The evaluation data selecting device 60 is an information processing device that reads the recognition data stored in the file server 50 and selects recognition data that is an object to be evaluated. The object to be evaluated is used by a supervisor to evaluate an operator by visually confirming the text at the agent evaluation device 80 or playing the phone call voice. The selection is performed by applying the "operation of the evaluation data selecting device" corresponding to the "evaluation viewpoint" of the evaluation viewpoint management table of the evaluation viewpoint management device 70.

The evaluation viewpoint management device 70 is an information processing device that includes the evaluation viewpoint management table. The evaluation viewpoint management device functions to search the evaluation viewpoint management table on the basis of the "evaluation viewpoint" information, to acquire the "operation of the evaluation data selecting device" or the "operation of the agent evaluation device" that corresponds to the "evaluation viewpoint", and to transmit the operation to the evaluation data selecting device 60 and/or the agent evaluation device 80. Further, the evaluation viewpoint management device may function to perform maintenance and management, such as the addition, update, and deletion of the data stored in the evaluation viewpoint management table. Meanwhile, a supervisor performs an operation such as pressing a button corresponding to a desired "evaluation viewpoint" from a list displayed on a predetermined display, so that the evaluation viewpoint management device 70 acquires the "evaluation viewpoint" information. In this case, the "evaluation viewpoint", the "operation of the evaluation data selecting device", and the "operation of the agent evaluation device" are associated with one another and are stored in the evaluation viewpoint management table.

The agent evaluation device 80 is an information processing device used by a supervisor at a contact center. The agent evaluation device includes an agent reproduction unit 81 that functions to play voice, and a text display unit 82 that functions to display the text of the recognition data. The output of the identification result data used for evaluation is performed in accordance with the "operation of the agent evaluation device" corresponding to the "evaluation viewpoint" of the evaluation viewpoint management table of the evaluation viewpoint management device 70. While visually confirming the contents of the recognition data displayed on a display unit such as a liquid crystal screen, a supervisor performs evaluation by playing phone call voice from an anxious portion and auditorily confirming the voice. Meanwhile, the text is useful in generally understanding for a short time the contents of the conversation, and the voice is useful in determining intonation or the adequacy of utterance during the conversation. However, both the text and the voice do not necessarily need to be used together, and only one of them may be used to perform the evaluation.

Next, the flow of an agent evaluation process according to the present embodiment will be described. However, since the flow is basically the same as that in the first exemplary embodiment, the description will not be repeated.

Then, a seventh exemplary embodiment of the present invention will be described in detail below with reference to drawings.

Referring to FIG. 13, an agent evaluation system according to the present embodiment includes a facing person device 90, a management server 40, a file server 50, an evaluation data selecting device 60, a evaluation viewpoint management device 70, and agent evaluation device 80.

The seventh exemplary embodiment is different from the sixth exemplary embodiment in that the agent evaluation system does not include the customer's phone 10 and the operator's phone 20, and the operator device 30 is substituted with the facing person device 90. However, since basic functions of other components are the same as those in the sixth exemplary embodiment, the description will not be repeated.

The operator device 30 is an information processing device used by an operator at a contact center, and is connected to a voice recorder that is an exemplary embodiment of a voice acquisition unit 31. In contrast, the facing person device 90 is an information processing device that records conversation of a person who is engaged in answering while facing a customer during a face-to-face answer. The conversation made between the operator and the customer at the time of the answer is recorded by a voice acquisition unit 91, and recognition data are generated from the voice data at a voice recognition unit 92. A data transmission unit 93 makes the recognition data, which are generated at the voice recognition unit 92, correspond to voice data serving as sources. Further, the data transmission unit adds data, which are used to identify a customer or date and time of answer, to the voice data, and transmits the voice data to the file server 50. Meanwhile, a person who is engaged in answering while facing a customer is, for example, a clerk who has a conversation with a customer in accordance with a manual at a counter of a fast-food restaurant, a convenience store, a supermarket, or the like, or a person who is in charge of an office counter work at a window of a bank, a post office, or the like. However, it is not limited as long as a person having a conversation face to face with a customer.

In addition, the facing person device 90 may further include a speaker recognition unit 94, which specifies a speaker by using speaker's voiceprint and the like, in order to identify the person who is engaged in answering while facing a customer. The reason for this is that the facing person device 90 needs to identify a person who is engaged in answering while facing a customer because a person who is engaged in answering while facing a customer does not necessarily have a reserved seat. Meanwhile, the speaker recognition unit 94 may identify a person by the login using a specific ID.

The flow of a process for evaluating an agent using voice data of conversational voice of the person identified by the speaker recognition unit 94 of the facing person device 90 and recognition data based on the voice data is embodied by applying each of the steps of the first exemplary embodiment.

The present embodiment can be applied in the following case: a clerk who works a cash register at a counter of a fast-food restaurant, a convenience store, a supermarket, or the like has a conversation with a customer in accordance with a manual, or a person who is in charge of an office counter work at a window of a bank, a post office, or the like has a conversation with a customer or gives an explanation in order to perform predetermined accountability.

Further, it is possible to apply the voice data, which is obtained by recording the conversation of a person who is engaged in answering while facing a customer during a face-to-face answer in the facing person device 90 of the present embodiment, to the above first to sixth exemplary embodiments.

An eighth exemplary embodiment of the present invention will be described below. The basic structure and the process of the present embodiment are the same as those of the first to seventh exemplary embodiments, but the present embodiment is different in that voice data is not limited to the "conversation between a customer and an agent". For example, the response or conversation between a pilot and a controller becomes an object. The object is not limited to the conversation between two people, and may also be the conversation among a plurality of people. Therefore, the object may include utterance of one person as well as dialogue and conversation.

Meanwhile, each of the above-mentioned embodiments is a preferred embodiment of the present invention, and various modifications may be made thereto without departing from the scope and spirit of the present invention. For example, the processes for achieving the functions of the devices may be performed by making devices read and execute programs for achieving the functions of the monitoring device 1, the evaluation data selecting device, the agent evaluation device, the server, the client terminal, the operator device 30, the management server 40, the file server 50, the evaluation data selecting device 60, the evaluation viewpoint management device 70, the agent evaluation device 80, and the facing person device 90 according to each of the exemplary embodiments. In addition, the programs may be transmitted to another computer system by a computer-readable recording medium, such as a CD-ROM or a magnetic optical disk, or by a wave through a transmission medium, such as an Internet or a phone line.

The structure of the system where the evaluation viewpoint management unit 3, the selection unit 4, the evaluation unit 5, the server, the client terminal, the operator device 30, the management server 40, the file server 50, the evaluation data selecting device 60, the agent evaluation device 80, the evaluation viewpoint management device 70, and the facing person device 90 are separately connected has been described in each of the above-mentioned embodiments. However, it is natural that the present invention may be applied to the structure where each of the functions is embodied as one computer system or the structure where a plurality of devices are added for each function.

BRIEF DESCRIPTION OF THE DRAWINGS

FIG. 1 is a schematic view showing the configuration of a monitoring device according to a first exemplary embodiment of the present invention.

FIG. 2 is a view showing the data structure of an evaluation viewpoint management table of the first exemplary embodiment of the present invention.

FIG. 3 is a view showing the data structure of a data storage unit of the first exemplary embodiment of the present invention.

FIG. 10 is a schematic view showing the configuration of a monitoring device according to a second exemplary embodiment of the present invention.

FIG. 12 is a block diagram showing partial functions of the agent evaluation system according to the sixth exemplary embodiment of the present invention.

DESCRIPTION OF THE REFERENCE NUMERALS

Figure 4:
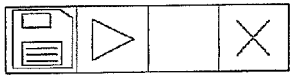
FIG. 4 is a view showing an example of a text displayed on a display unit of the first exemplary embodiment of the present invention.
Figure 5:
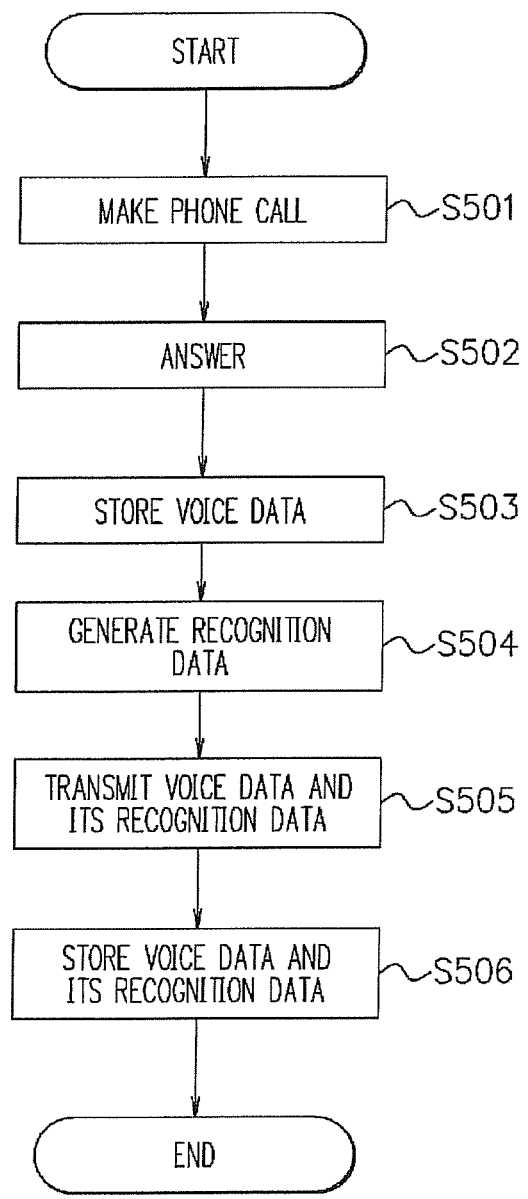
FIG. 5 is a flowchart illustrating a process until phone call voice is stored as recognition data.
Figure 6:
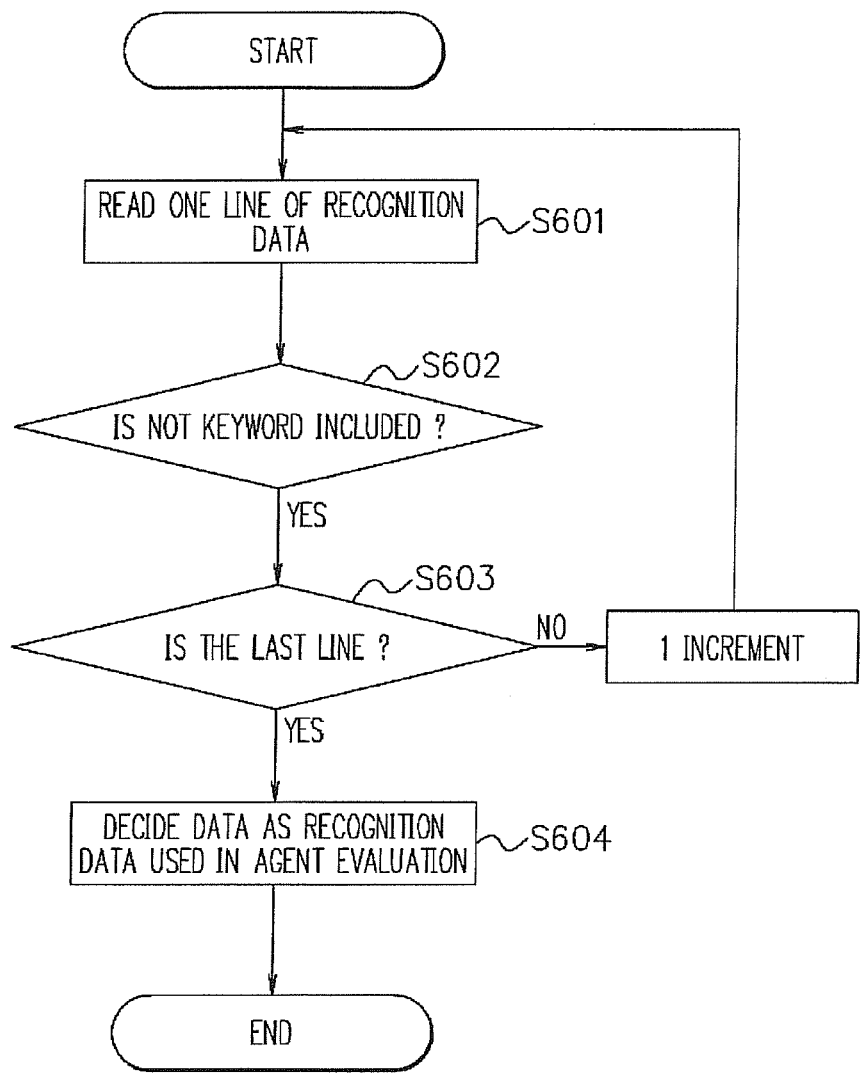
FIG. 6 is a flowchart illustrating a process for detecting that a specific keyword does not appear.
Figure 7:
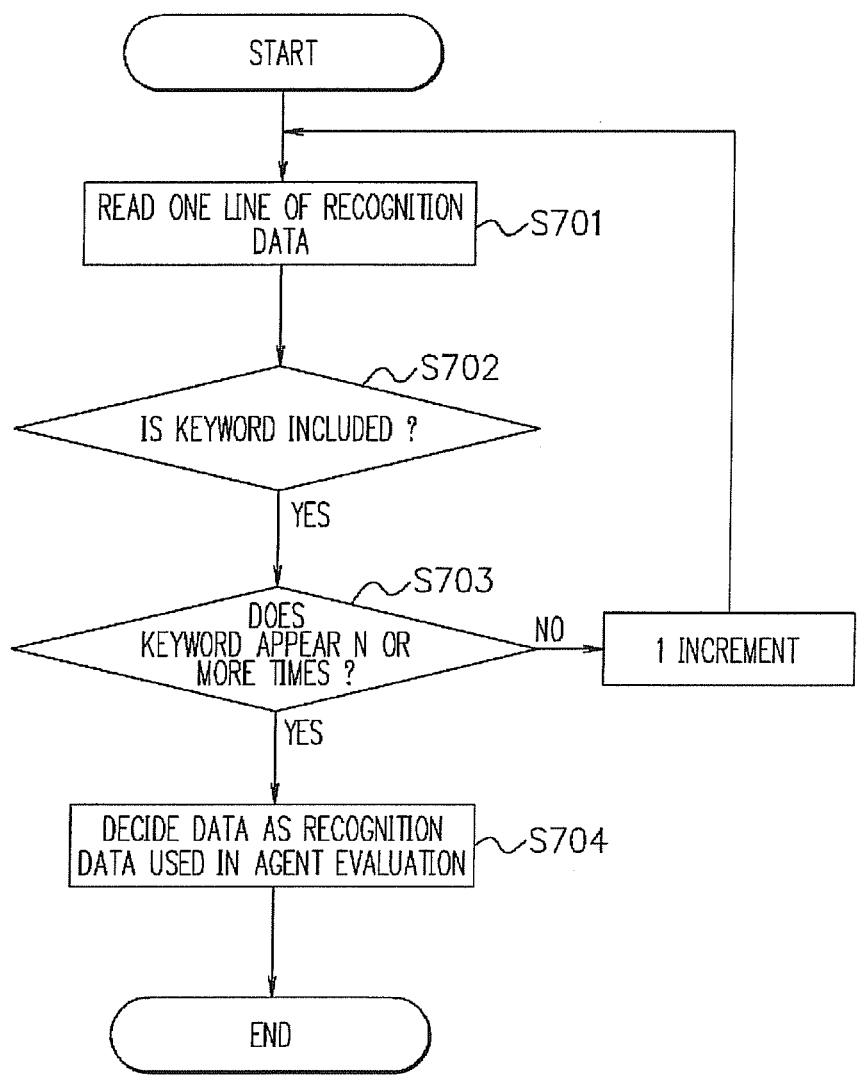
FIG. 7 is a flowchart illustrating a process for detecting that a specific keyword appears one or more times.
Figure 8:
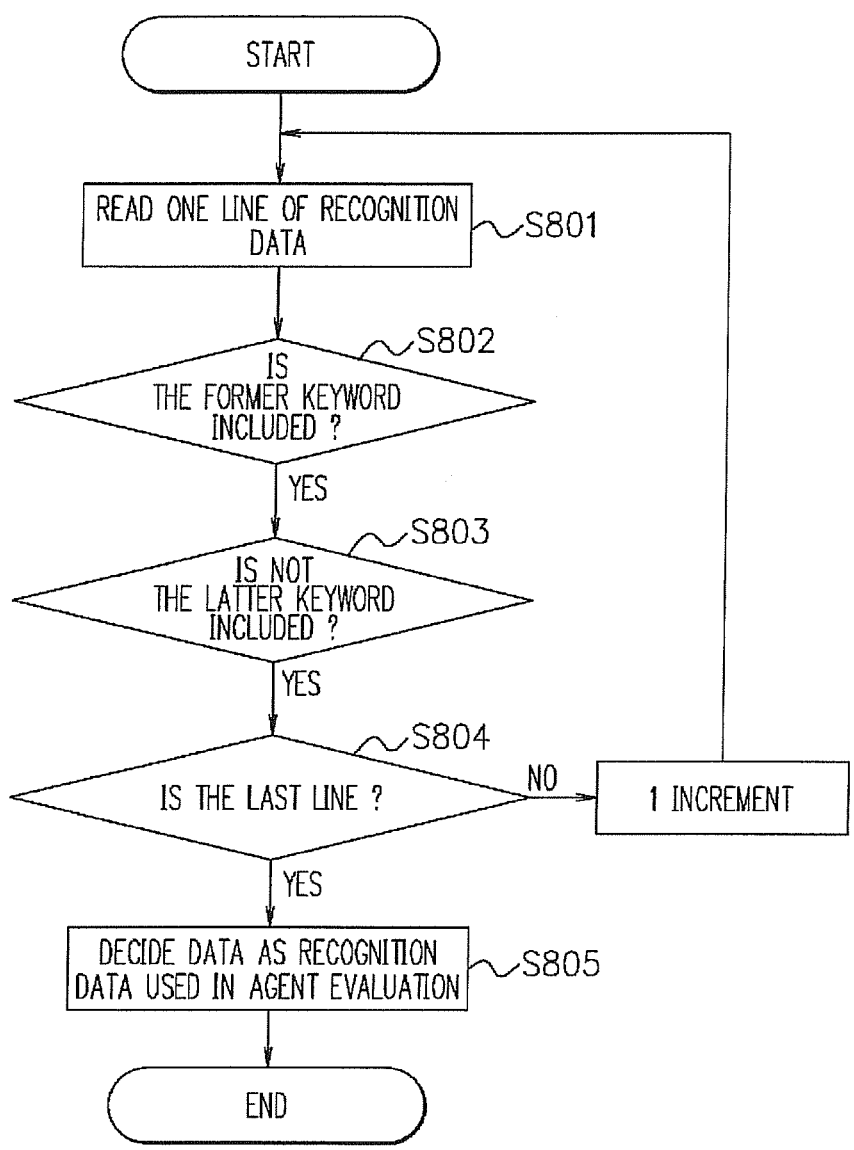
FIG. 8 is a flowchart illustrating a process for detecting whether a specific keyword is present or not within a predetermined period of time.
Figure 9:
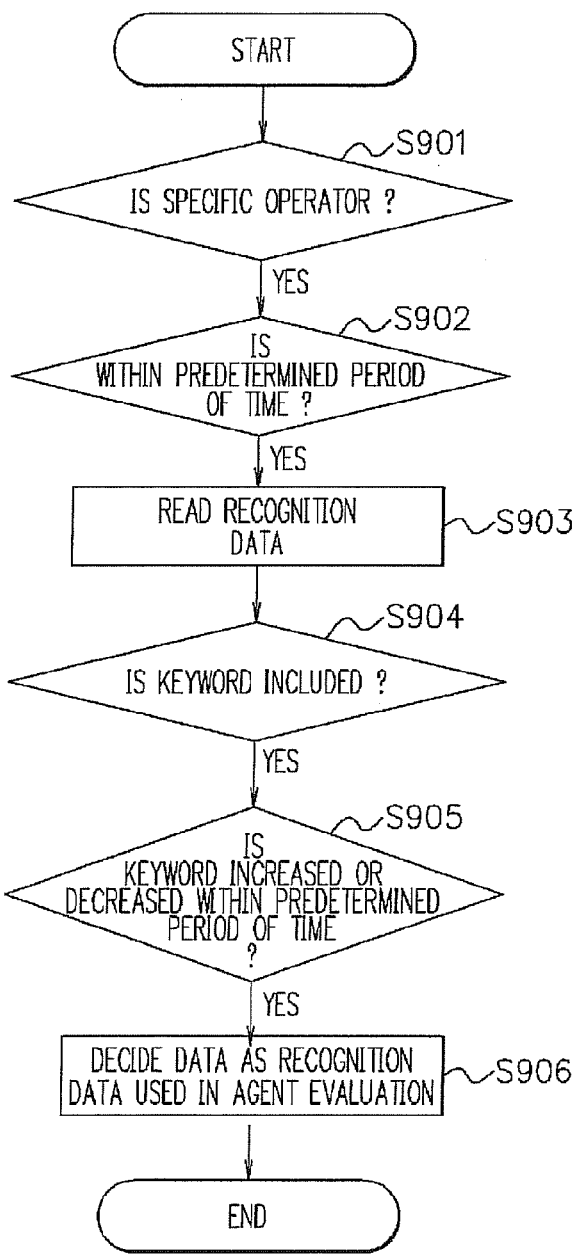
FIG. 9 is a flowchart illustrating a process for detecting only a part of specific keywords appears.
Figure 11:
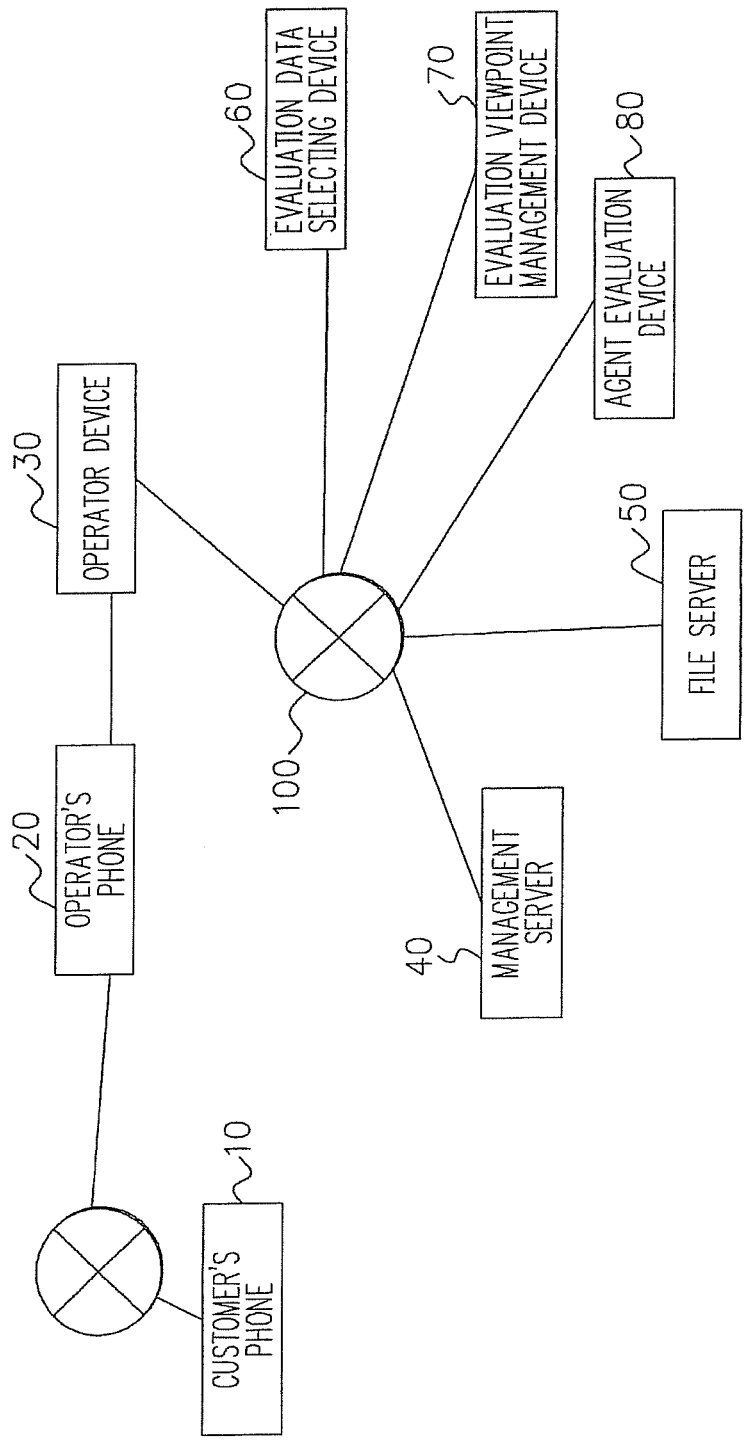
FIG. 11 is a schematic view showing the configuration of an agent evaluation system according to a sixth exemplary embodiment of the present invention.
Figure 13:
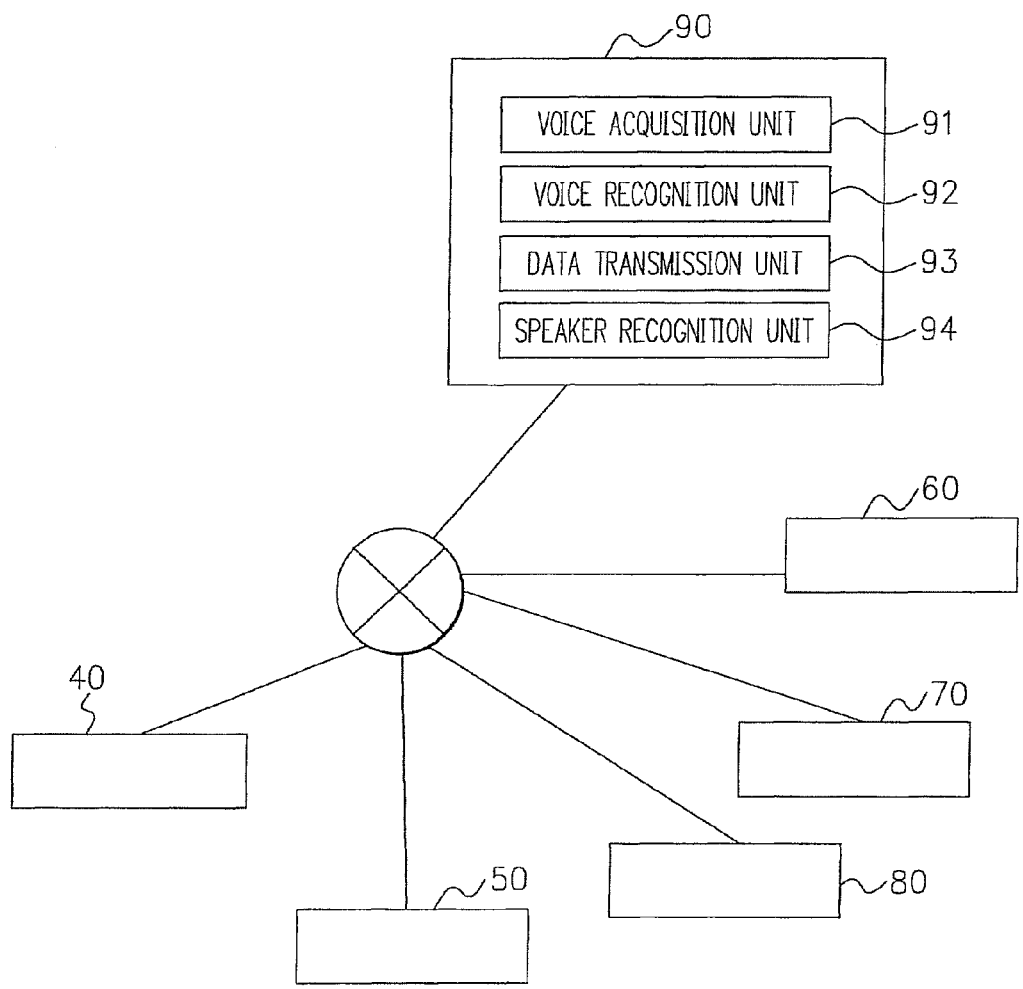
FIG. 13 is a schematic view showing the configuration of an agent evaluation system according to a seventh exemplary embodiment of the present invention.

1 monitoring device
2 evaluation viewpoint management table
3 evaluation viewpoint management unit
4 selection unit
5 evaluation unit
6 voice recognition unit
7 data storage unit

The invention claimed is:

1. A monitoring device comprising:
a selection unit that selects voice data and/or its recognition data used in agent evaluation, by applying a selection operation corresponding to evaluation viewpoint information stored in an evaluation viewpoint storing unit, from call logging data that includes at least the voice data obtained by monitoring utterance, the recognition data generated from the voice data by voice recognition, and correspondence relationship data between the voice data and its recognition data; and
an evaluation unit that plays the voice data and/or displaying the recognition data, which are selected by the selection unit and used in the agent evaluation, by applying an output operation corresponding to the evaluation viewpoint information stored in the evaluation viewpoint storing unit.

2. The monitoring device according to claim 1,
wherein the selection operation, which is taken by the selection unit and corresponds to the evaluation viewpoint information, is at least one of a pattern for detecting a specific keyword, a pattern for detecting an unspecific phrase, a pattern for detecting a time-series pattern, and a pattern for detecting a change in increase and decrease of the same phrase for a predetermined period of time.

3. The monitoring device according to claim 1,
wherein the selection operation, which is taken by the selection unit and corresponds to the evaluation viewpoint information, is at least one of a pattern for detecting that a specific keyword does not appear, a pattern for detecting that a specific keyword appears, a pattern for detecting that a specific keyword appears frequently, a pattern for detecting only a part of specific keywords appears, a pattern for detecting that both keywords appear, a pattern for detecting whether a specific keyword appears after a specific operation, a pattern for detecting a phrase that repeatedly appears, a pattern for detecting a speed of utterance from the number of letters per unit time, a pattern for detecting long utterance, a pattern for detecting silent time after a specific keyword, a pattern for detecting whether a specific keyword is increased in a specific speaker's utterance for a predetermined period of time, a pattern for detecting a phrase of which frequency of appearance is significantly increased or decreased for a predetermined period of time, and a pattern for detecting the phrase which appears with a specific keyword and of which frequency of appearance is significantly increased or decreased for a predetermined period of time.

4. The monitoring device according to claim 1, wherein said voice data is voice data at a contact center.

5. The monitoring device according to claim 1, wherein said voice data is voice data in face-to-face dialogue.

6. A computer-readable medium storing a program that achieves a function according to claim 1 on a computer.

7. An evaluation data comprising:
an evaluation viewpoint storing unit that stores evaluation viewpoint information; and
a selection unit that selects voice data and/or its recognition data used in agent evaluation, by applying a selection operation corresponding to the evaluation viewpoint information, from call logging data that includes at least the voice data obtained by monitoring utterance, the recognition data generated from the voice data by voice recognition, and correspondence relationship data between the voice data and its recognition data,
wherein the selection operation, which corresponds to the evaluation viewpoint information, is at least one of a pattern for detecting an unspecific phrase, a pattern for detecting a time-series pattern, and a pattern for detecting a change in increase and decrease of the same phrase for a predetermined period of time.

8. The evaluation data selecting device according to claim 7,
wherein the selection operation, which corresponds to the evaluation viewpoint information, is at least one of a pattern for detecting that a specific keyword does not appear, a pattern for detecting only a part of specific keywords appears, a pattern for detecting that both keywords appear, a pattern for detecting whether a specific keyword appears after a specific operation, a pattern for detecting a phrase that repeatedly appears, a pattern for detecting a speed of utterance from the number of letters per unit time, a pattern for detecting long utterance, a pattern for detecting silent time after a specific keyword, a pattern for detecting whether a specific keyword is increased in a specific speaker's utterance for a predetermined period of time, a pattern for detecting a phrase of which frequency of appearance is significantly increased or decreased for a predetermined period of time, and a pattern for detecting a phrase which appears with a specific keyword and of which frequency of appearance is significantly increased or decreased for a predetermined period of time.

9. The evaluation data selecting device according to claim 7,
wherein said voice data is voice data at a contact center.

10. The evaluation data selecting device according to claim 7
wherein said voice data is voice data in face-to-face dialogue.

11. A computer-readable medium storing a program that achieves a function according to claim 7 on a computer.

12. An agent evaluation device comprising:
an evaluation viewpoint storing unit that stores evaluation viewpoint information; and
a play unit that plays voice data and/or displays recognition data, which are used in agent evaluation, by applying an output operation corresponding to the evaluation viewpoint information, from call logging data that includes at least the voice data obtained by monitoring utterance, the recognition data generated from the voice data by voice recognition, and correspondence relationship data between the voice data and its recognition data.

13. The agent evaluation device according to claim 12, wherein said voice data is voice data at a contact center.

14. The agent evaluation device according to claim 12, wherein said voice data is voice data in face-to-face dialogue.

15. A computer-readable medium storing a program that achieves a function according to claim 12 on a computer.

16. An agent evaluation system comprising:
a server for selecting evaluation data; and
one or more client terminals,
wherein the server selects voice data and/or its recognition data used in agent evaluation, by applying a selection operation corresponding to evaluation viewpoint information stored in an evaluation viewpoint storing unit, from call logging data that includes at least the voice data obtained by monitoring utterance, the recognition data generated from the voice data by voice recognition, and correspondence relationship data between the voice data and its recognition data, and
the client terminals play the voice data and/or display the recognition data, which are used in the agent evaluation, by applying an output operation corresponding to the evaluation viewpoint information stored in the evaluation viewpoint storing unit.

17. The agent evaluation system according to claim 16,
wherein the selection operation, which corresponds to the evaluation viewpoint information, is at least one of a pattern for detecting a specific keyword, a pattern for detecting an unspecific phrase, a pattern for detecting a time-series pattern, and a pattern for detecting the change in increase and decrease of the same phrase for a predetermined period of time.

18. The agent evaluation system according to claim 16,
wherein the selection operation, which corresponds to the evaluation viewpoint information, is at least one of a pattern for detecting that a specific keyword does not appear, a pattern for detecting that a specific keyword appears, a pattern for detecting that a specific keyword appears frequently, a pattern for detecting only a part of specific keywords appears, a pattern for detecting that both keywords appear, a pattern for detecting whether a specific keyword appears after a specific operation, a pattern for detecting a phrase that repeatedly appears, a pattern for detecting the speed of utterance from the number of letters per unit time, a pattern for detecting long utterance, a pattern for detecting silent time after a specific keyword, a pattern for detecting whether a specific keyword is increased in a specific speaker's utterance for a predetermined period of time, a pattern for detecting a phrase of which frequency of appearance is significantly increased or decreased for a predetermined period of time, and a pattern for detecting the phrase which appears with a specific keyword and of which frequency of appearance is significantly increased or decreased for a predetermined period of time.

19. The agent evaluation system according to claim 16, wherein said voice data is voice data at a contact center.

20. The agent evaluation system according to claim 16, wherein said voice data is voice data in face-to-face dialogue.

21. A computer-readable medium storing a program that achieves a function according to claim 16 on a computer.

22. An agent evaluation system comprising:
a customer's phone;
an operator's phone;
an operator device;
a file server;
an evaluation data selecting device;

an evaluation viewpoint management device; and
an agent evaluation device,
wherein the operator device transmits call logging data, which includes at least voice data of a contact center obtained by monitoring conversation performed between a customer and an operator using the customer's phone and the operator's phone, recognition data generated from the voice data by voice recognition, and correspondence relationship data between the voice data and its recognition data, to the file server,
the evaluation data selecting device selects the voice data and/or its recognition data used in agent evaluation, by applying a selection operation corresponding to evaluation viewpoint information stored in an evaluation viewpoint storing unit of the evaluation viewpoint management device, from the call logging data stored in the file server, and
the agent evaluation device plays the voice data and/or displays the recognition data, which are selected by the evaluation data selecting device and used in the agent evaluation, by applying an output operation corresponding to the evaluation viewpoint information stored in the evaluation viewpoint storing unit of the evaluation viewpoint management device.

23. The agent evaluation system according to claim 22, wherein the selection operation, which is taken by the evaluation data selecting device and corresponds to the evaluation viewpoint information, is at least one of a pattern for detecting a specific keyword, a pattern for detecting an unspecific phrase, a pattern for detecting a time-series pattern, and a pattern for detecting a change in increase and decrease of the same phrase for a predetermined period of time.

24. The agent evaluation system according to claim 22, wherein the selection operation, which is taken by the evaluation data selecting device and corresponds to the evaluation viewpoint information, is at least one of a pattern for detecting that a specific keyword does not appear, a pattern for detecting that a specific keyword appears, a pattern for detecting that a specific keyword appears frequently, a pattern for detecting only a part of specific keywords appears, a pattern for detecting that both keywords appear, a pattern for detecting whether a specific keyword appears after a specific operation, a pattern for detecting a phrase that repeatedly appears, a pattern for detecting a speed of utterance from the number of letters per unit time, a pattern for detecting long utterance, a pattern for detecting silent time after a specific keyword, a pattern for detecting whether a specific keyword is increased in a specific speaker's utterance for a predetermined period of time, a pattern for detecting a phrase of which frequency of appearance is significantly increased or decreased for a predetermined period of time, and a pattern for detecting the phrase which appears with a specific keyword and of which frequency of appearance is significantly increased or decreased for a predetermined period of time.

25. A computer-readable medium storing a program that achieves a function according to claim 22 on a computer.

26. A monitoring device comprising:
selection means for selecting voice data and/or its recognition data used in agent evaluation, by applying a selection operation corresponding to evaluation viewpoint information stored in evaluation viewpoint storing means, from call logging data that includes at least the voice data obtained by monitoring utterance, the recognition data generated from the voice data by voice recognition, and correspondence relationship data between the voice data and its recognition data; and
evaluation means for playing the voice data and/or displaying the recognition data, which are selected by the selection means and used in the agent evaluation, by applying an output operation corresponding to the evaluation viewpoint information stored in the evaluation viewpoint storing means.

27. An evaluation data selecting device comprising:
evaluation viewpoint storing means for storing evaluation viewpoint information; and
selection means for selecting voice data and/or its recognition data used in agent evaluation, by applying a selection operation corresponding to the evaluation viewpoint information, from call logging data that includes at least the voice data obtained by monitoring utterance, the recognition data generated from the voice data by voice recognition, and correspondence relationship data between the voice data and its recognition data,
wherein the selection operation, which corresponds to the evaluation viewpoint information, is at least one of a pattern for detecting an unspecific phrase, a pattern for detecting a time-series pattern, and a pattern for detecting a change in increase and decrease of the same phrase for a predetermined period of time.

28. An agent evaluation device comprising:
evaluation viewpoint storing means for storing evaluation viewpoint information; and
play means for playing voice data and/or displays recognition data, which are used in agent evaluation, by applying an output operation corresponding to the evaluation viewpoint information, from call logging data that includes at least the voice data obtained by monitoring utterance, the recognition data generated from the voice data by voice recognition, and correspondence relationship data between the voice data and its recognition data.

29. An agent evaluation system comprising:
a server for selecting evaluation data; and
one or more client terminals,
wherein the server selects voice data and/or its recognition data used in agent evaluation, by applying a selection operation corresponding to evaluation viewpoint information stored in evaluation viewpoint storing means, from call logging data that includes at least the voice data obtained by monitoring utterance, the recognition data generated from the voice data by voice recognition, and correspondence relationship data between the voice data and its recognition data, and
the client terminals play the voice data and/or display the recognition data, which are used in the agent evaluation, by applying an output operation corresponding to the evaluation viewpoint information stored in the evaluation viewpoint storing means.

30. An agent evaluation system comprising:
a customer's phone;
an operator's phone;
an operator device;
a file server;
an evaluation data selecting device;
an evaluation viewpoint management device; and
an agent evaluation device,
wherein the operator device transmits call logging data, which includes at least voice data of a contact center obtained by monitoring conversation performed between a customer and an operator using the customer's phone and the operator's phone, recognition data generated from the voice data by voice recognition, and correspondence relationship data between the voice data and its recognition data, to the file server, the evaluation data selecting device selects the voice data and/or its recognition data used in agent evaluation, by applying a selection operation corresponding to evaluation viewpoint information stored in evaluation viewpoint storing means of the evaluation viewpoint management device, from the call logging data stored in the file server, and the agent evaluation device plays the voice data and/or displays the recognition data, which are selected by the evaluation data selecting device and used in the agent evaluation, by applying an output operation corresponding to the evaluation viewpoint information stored in the evaluation viewpoint storing means of the evaluation viewpoint management device.

* * * * *